(12) United States Patent
Dettinger et al.

(10) Patent No.: US 8,122,012 B2
(45) Date of Patent: Feb. 21, 2012

(54) ABSTRACT RECORD TIMELINE RENDERING/DISPLAY

(75) Inventors: Richard D. Dettinger, Rochester, MN (US); Daniel P. Kolz, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 1699 days.

(21) Appl. No.: 11/035,565

(22) Filed: Jan. 14, 2005

(65) Prior Publication Data

US 2006/0161556 A1 Jul. 20, 2006

(51) Int. Cl.
G06F 17/30 (2006.01)

(52) U.S. Cl. .................................. 707/722; 715/200
(58) Field of Classification Search .................. 707/722; 715/200
See application file for complete search history.

(56) References Cited

U.S. PATENT DOCUMENTS

| | | |
|---|---|---|
| 3,553,368 A | 1/1971 | Rudolph |
| 5,253,362 A | 10/1993 | Nolan et al. |
| 5,265,246 A | 11/1993 | Li et al. |
| 5,345,586 A | 9/1994 | Hamala et al. |
| 5,369,778 A | 11/1994 | San Soucie et al. |
| 5,404,510 A | 4/1995 | Smith et al. |
| 5,418,950 A | 5/1995 | Li et al. |
| 5,446,885 A | 8/1995 | Moore et al. |
| 5,446,890 A | 8/1995 | Renslo et al. |
| 5,459,859 A | 10/1995 | Senda |
| 5,471,611 A | 11/1995 | McGregor |
| 5,499,368 A | 3/1996 | Tate et al. |
| 5,506,984 A | 4/1996 | Miller |
| 5,515,488 A | 5/1996 | Hoppe et al. |
| 5,584,024 A | 12/1996 | Shwartz |
| 5,592,663 A | 1/1997 | Nagamori |
| 5,630,121 A | 5/1997 | Braden-Harder et al. |
| 5,701,453 A | 12/1997 | Maloney et al. |
| 5,721,903 A | 2/1998 | Anand et al. |
| 5,725,227 A | 3/1998 | Mayer |
| 5,734,887 A | 3/1998 | Kingberg et al. |
| 5,809,497 A | 9/1998 | Freund et al. |
| 5,870,559 A | 2/1999 | Leshem et al. |
| 5,918,232 A | 6/1999 | Pouschine et al. |

(Continued)

FOREIGN PATENT DOCUMENTS

JP 2002149697 A 5/2002

OTHER PUBLICATIONS

U.S. Appl. No. 10/083,075, "Application Portability and Extensibility Through Database Schema and Query Abstraction", filed Feb. 26, 2002.

(Continued)

*Primary Examiner* — Hosain Alam
*Assistant Examiner* — Johnese Johnson
(74) *Attorney, Agent, or Firm* — Patterson & Sheridan LLP

(57) ABSTRACT

Embodiments of the invention provide techniques for constructing a database abstraction model over an underlying physical database. Once constructed, users may interact with the database abstraction model, rather than the underlying physical database representation, to query the database and view query results. In one embodiment, information is retrieved from the underlying physical database that is related to a model entity and displayed on a timeline. Generally, a model entity identifies the logical focus, or the central entity, being queried by user interacting with a query application. An abstract record identifies what data about each model entity is available to query using the database abstraction model.

16 Claims, 14 Drawing Sheets

U.S. PATENT DOCUMENTS

| | | |
|---|---|---|
| 5,943,666 A | 8/1999 | Kleewein et al. |
| 5,958,008 A | 9/1999 | Pogrebisky et al. |
| 5,987,446 A | 11/1999 | Corey et al. |
| 5,999,933 A | 12/1999 | Mehta |
| 5,999,944 A | 12/1999 | Lipkin |
| 6,003,034 A | 12/1999 | Tuli |
| 6,009,422 A | 12/1999 | Ciccarelli |
| 6,014,656 A | 1/2000 | Hallmark et al. |
| 6,026,363 A | 2/2000 | Shepard |
| 6,061,506 A | 5/2000 | Wollaston et al. |
| 6,076,066 A | 6/2000 | DiRienzo et al. |
| 6,222,540 B1 | 4/2001 | Sacerdoti |
| 6,226,650 B1 | 5/2001 | Mahajan et al. |
| 6,233,570 B1 | 5/2001 | Horvitz et al. |
| 6,233,586 B1 | 5/2001 | Chang et al. |
| 6,272,488 B1 | 8/2001 | Chang et al. |
| 6,289,334 B1 | 9/2001 | Reiner et al. |
| 6,341,277 B1 | 1/2002 | Coden et al. |
| 6,343,291 B1 | 1/2002 | Goldman |
| 6,353,826 B1 | 3/2002 | Seputis |
| 6,370,547 B1 | 4/2002 | Eftink |
| 6,397,223 B1 | 5/2002 | Kori |
| 6,408,291 B1 | 6/2002 | Skeen et al. |
| 6,442,543 B1 | 8/2002 | Snodgrass et al. |
| 6,449,620 B1 | 9/2002 | Draper et al. |
| 6,457,003 B1 | 9/2002 | Gajda et al. |
| 6,457,009 B1 | 9/2002 | Bollay |
| 6,460,043 B1 | 10/2002 | Tabbara et al. |
| 6,484,162 B1 | 11/2002 | Edlund et al. |
| 6,484,164 B1 | 11/2002 | Nikolovska et al. |
| 6,499,026 B1 | 12/2002 | Rivette et al. |
| 6,546,388 B1 | 4/2003 | Edlund et al. |
| 6,553,368 B2 | 4/2003 | Martin et al. |
| 6,578,027 B2 | 6/2003 | Cambot et al. |
| 6,581,038 B1 | 6/2003 | Mahran |
| 6,581,054 B1 | 6/2003 | Bogrett |
| 6,601,065 B1 | 7/2003 | Nelson et al. |
| 6,609,123 B1 | 8/2003 | Cazemier et al. |
| 6,611,838 B1 | 8/2003 | Ignat et al. |
| 6,618,727 B1 | 9/2003 | Wheeler et al. |
| 6,633,817 B1 | 10/2003 | Walker et al. |
| 6,643,633 B2 | 11/2003 | Chau et al. |
| 6,647,382 B1 | 11/2003 | Saracco |
| 6,651,055 B1 | 11/2003 | Kilmer et al. |
| 6,658,410 B1 | 12/2003 | Sakamaki et al. |
| 6,678,674 B1 | 1/2004 | Saeki |
| 6,711,563 B1 | 3/2004 | Koskas et al. |
| 6,725,225 B1 | 4/2004 | Kori |
| 6,725,227 B1 | 4/2004 | Li |
| 6,732,094 B1 | 5/2004 | Cousins et al. |
| 6,745,178 B1 | 6/2004 | Emens et al. |
| 6,772,150 B1 | 8/2004 | Whitman et al. |
| 6,795,825 B2 | 9/2004 | Rishe |
| 6,799,184 B2 | 9/2004 | Bhatt et al. |
| 6,801,229 B1 | 10/2004 | Tinkler |
| 6,803,927 B1 | 10/2004 | Sahoo |
| 6,820,076 B2 | 11/2004 | Bailey et al. |
| 6,928,431 B2 | 8/2005 | Dettinger et al. |
| 6,947,928 B2 | 9/2005 | Dettinger et al. |
| 6,947,952 B1 | 9/2005 | Welch et al. |
| 6,954,748 B2 | 10/2005 | Dettinger et al. |
| 6,978,324 B1 | 12/2005 | Black |
| 6,985,912 B2 | 1/2006 | Mullins et al. |
| 6,996,558 B2 | 2/2006 | Dettinger et al. |
| 7,003,730 B2 | 2/2006 | Dettinger et al. |
| 7,024,425 B2 | 4/2006 | Krishnaprasad et al. |
| 7,054,877 B2 | 5/2006 | Dettinger et al. |
| 7,092,936 B1 | 8/2006 | Alonso et al. |
| 7,096,217 B2 | 8/2006 | Dettinger et al. |
| 7,096,229 B2 | 8/2006 | Dettinger et al. |
| 7,139,766 B2 | 11/2006 | Thomson et al. |
| 7,139,774 B2 | 11/2006 | Dettinger et al. |
| 7,146,376 B2 | 12/2006 | Dettinger et al. |
| 7,213,017 B2 | 5/2007 | Rys et al. |
| 7,249,118 B2 | 7/2007 | Sandler et al. |
| 7,263,517 B2 | 8/2007 | Sheu et al. |
| 7,310,639 B2 | 12/2007 | Dettinger et al. |
| 7,321,895 B2 | 1/2008 | Dettinger et al. |
| 7,333,981 B2 | 2/2008 | Dettinger et al. |
| 7,340,475 B2 | 3/2008 | Chowdhary et al. |
| 7,343,365 B2 | 3/2008 | Farnham et al. |
| 7,363,287 B2 | 4/2008 | Kilmer et al. |
| 7,383,255 B2 | 6/2008 | Desai et al. |
| 7,398,263 B2 | 7/2008 | Dettinger et al. |
| 7,440,945 B2 | 10/2008 | Dettinger et al. |
| 7,444,332 B2 | 10/2008 | Dettinger et al. |
| 7,461,052 B2 | 12/2008 | Dettinger et al. |
| 7,480,648 B2 | 1/2009 | Adams et al. |
| 7,519,577 B2 | 4/2009 | Brundage et al. |
| 7,539,662 B2 | 5/2009 | Dettinger et al. |
| 7,555,497 B2 | 6/2009 | Thompson et al. |
| 7,624,097 B2 | 11/2009 | Dettinger et al. |
| 7,668,806 B2 | 2/2010 | Liu et al. |
| 7,743,019 B2 | 6/2010 | Shah et al. |
| 7,818,347 B2 | 10/2010 | Dettinger et al. |
| 7,818,348 B2 | 10/2010 | Dettinger et al. |
| 2001/0016843 A1 | 8/2001 | Olson et al. |
| 2001/0037345 A1 | 11/2001 | Kiernan et al. |
| 2001/0047270 A1 | 11/2001 | Gusick et al. |
| 2002/0013790 A1 | 1/2002 | Vandersluis |
| 2002/0026630 A1 | 2/2002 | Schmidt et al. |
| 2002/0032676 A1 | 3/2002 | Reiner et al. |
| 2002/0046281 A1 | 4/2002 | Cope |
| 2002/0078045 A1 | 6/2002 | Dutta |
| 2002/0078068 A1 | 6/2002 | Krishnaprasad et al. |
| 2002/0091702 A1 | 7/2002 | Mullins |
| 2002/0091990 A1 | 7/2002 | Little et al. |
| 2002/0123984 A1 | 9/2002 | Prakash |
| 2002/0161602 A1 | 10/2002 | Dougherty et al. |
| 2003/0014399 A1 | 1/2003 | Hansen et al. |
| 2003/0028540 A1 | 2/2003 | Lindberg et al. |
| 2003/0046385 A1 | 3/2003 | Vincent |
| 2003/0046390 A1 | 3/2003 | Ball et al. |
| 2003/0061209 A1 | 3/2003 | Raboczi et al. |
| 2003/0061215 A1 | 3/2003 | Messina |
| 2003/0126136 A1 | 7/2003 | Omoigui |
| 2003/0136382 A1 | 7/2003 | Egler et al. |
| 2003/0140044 A1* | 7/2003 | Mok et al. ........................ 707/10 |
| 2003/0144994 A1 | 7/2003 | Wen et al. |
| 2003/0163455 A1 | 8/2003 | Dettinger et al. |
| 2003/0167274 A1 | 9/2003 | Dettinger et al. |
| 2003/0169284 A1* | 9/2003 | Dettinger et al. ............. 345/708 |
| 2003/0172056 A1 | 9/2003 | Dettinger et al. |
| 2003/0208486 A1 | 11/2003 | Dettinger et al. |
| 2003/0212666 A1 | 11/2003 | Basu et al. |
| 2003/0214525 A1 | 11/2003 | Esfahany |
| 2003/0217033 A1 | 11/2003 | Sandler et al. |
| 2003/0220893 A1 | 11/2003 | Dettinger et al. |
| 2004/0037345 A1 | 2/2004 | McCarty et al. |
| 2004/0039736 A1 | 2/2004 | Kilmer et al. |
| 2004/0039820 A1 | 2/2004 | Colby et al. |
| 2004/0046281 A1 | 3/2004 | Kim et al. |
| 2004/0048233 A1 | 3/2004 | Matthews et al. |
| 2004/0059746 A1 | 3/2004 | Error et al. |
| 2004/0073539 A1 | 4/2004 | Dettinger et al. |
| 2004/0088561 A1 | 5/2004 | Dettinger et al. |
| 2004/0148278 A1 | 7/2004 | Milo et al. |
| 2004/0158567 A1 | 8/2004 | Dettinger et al. |
| 2004/0172305 A1 | 9/2004 | Soerensen et al. |
| 2004/0243545 A1 | 12/2004 | Boone et al. |
| 2004/0260685 A1 | 12/2004 | Pfleiger et al. |
| 2004/0260691 A1 | 12/2004 | Desai et al. |
| 2004/0267760 A1 | 12/2004 | Brundage et al. |
| 2005/0004911 A1 | 1/2005 | Goldberg et al. |
| 2005/0068489 A1 | 3/2005 | Hall et al. |
| 2005/0071222 A1 | 3/2005 | Bigus et al. |
| 2005/0075996 A1 | 4/2005 | Dettinger et al. |
| 2005/0076015 A1 | 4/2005 | Dettinger et al. |
| 2005/0193114 A1 | 9/2005 | Colby et al. |
| 2005/0203878 A1 | 9/2005 | Brill et al. |
| 2005/0267760 A1 | 12/2005 | Meyer et al. |
| 2005/0289100 A1 | 12/2005 | Dettinger et al. |
| 2006/0010127 A1 | 1/2006 | Dettinger et al. |
| 2006/0047638 A1 | 3/2006 | Dettinger et al. |
| 2006/0053142 A1 | 3/2006 | Sebbane |
| 2006/0095457 A1 | 5/2006 | Glasspool et al. |
| 2006/0122965 A1 | 6/2006 | Adams et al. |

| | | |
|---|---|---|
| 2006/0122993 A1 | 6/2006 | Dettinger et al. |
| 2006/0136382 A1 | 6/2006 | Dettinger et al. |
| 2006/0136469 A1 | 6/2006 | Dettinger et al. |
| 2006/0136470 A1 | 6/2006 | Dettinger et al. |
| 2006/0155692 A1 | 7/2006 | Dettinger et al. |
| 2006/0161521 A1 | 7/2006 | Dettinger et al. |
| 2006/0161523 A1 | 7/2006 | Dettinger et al. |
| 2006/0161573 A1 | 7/2006 | Dettinger et al. |
| 2006/0212418 A1 | 9/2006 | Dettinger et al. |
| 2006/0282469 A1 | 12/2006 | Pan |
| 2007/0005566 A1 | 1/2007 | Bobick et al. |
| 2007/0067371 A1 | 3/2007 | Allan et al. |
| 2007/0112745 A1 | 5/2007 | Dettinger et al. |
| 2007/0112827 A1 | 5/2007 | Dettinger et al. |
| 2008/0091668 A1 | 4/2008 | Dettinger et al. |
| 2008/0154845 A1 | 6/2008 | Adams et al. |
| 2008/0215611 A1 | 9/2008 | Dettinger et al. |
| 2008/0215612 A1 | 9/2008 | Dettinger et al. |
| 2008/0301108 A1 | 12/2008 | Dettinger et al. |
| 2009/0055438 A1 | 2/2009 | Dettinger et al. |
| 2009/0063477 A1 | 3/2009 | Adams et al. |
| 2009/0182708 A1 | 7/2009 | Dettinger et al. |
| 2010/0076961 A1 | 3/2010 | Dettinger et al. |

OTHER PUBLICATIONS

U.S. Appl. No. 11/005,418, "Abstract Query Plan", filed Dec. 6, 2004.

Batory et al., "Implementing a Domain Model for Data Structures[1,2]," *International Journal of Software Engineering and Knowledge Engineering*, Sep. 1992, vol. 2(3): pp. 375-402.

Braunmüller et al., "Multiple Similarity Queries: A Basic DBMS Operation for Mining in Metric Databases," *IEEE Transactions on Knowledge and Data Engineering*, Jan./Feb. 2001, vol. 13(1): pp. 79-95.

Calmet et al., "A generic query-transaction framework for a mediator architecture," *Proceedings of the 13th International Conference on Data Engineering*, Apr. 1997: pp. 434-443.

Decision on Appeal of U.S. Appl. No. 11/016,203 dated May 2, 2011.

Franconi et al., "A Data Warehouse Conceptual Data Model for Multidimensional Aggregation," *Proceedings of the International Workshop on Design and management of Data Warehouses* (DMDW '99, 1999: pp. 13-1-13-10.

Llama, "Search Code: Search Your Database," <http://www.codewalkers.com/c/a/Search-Code/Search-Your-Database/>, retrieved Mar. 23, 2009, pp. 1-4.

Lerm et al., "Cooperative access to relational and object-oriented federated databases," *IEEE Proceedings of the Fourth Workshop on Future Trends of Distributed Computing Systems*, Sep. 1993: pp. 222-227.

Meng et al., "A Theory of Translation From Relational Queries to Hierarchical Queries," *IEEE Transactions on Knowledge and Data Engineering*, Apr. 1995, vol. 7(2): pp. 228-245.

Raghavan et al., "On The Reuse Of Past Optimal Queries," *Proceedings of the 18th Annual International ACM SIGIR Conference on Research and Development in Information Retrieval*, Association for Computing Machinery, Inc., 1995: pp. 344-350.

Rahm et al., "A survey of approaches to automatic schema matching," *The VLDB Journal*, 2001, vol. 10: pp. 334-350.

Rys, "Bringing the Internet to Your Database: Using SQL Server 2000 and XML to Build Loosely-Coupled Systems," *17th International Conference on Data Engineering (ICDE '01)*, Apr. 2001: pp. 465-472.

*The American Heritage College Dictionary*, 2004, Houghton & Mifflin, Fourth Edition: p. 977.

Wen et al., "Clustering User Queries of a Search Engine," *Proceedings of the 10th International Conference on World Wide Web*, Association for Computing Machinery, Inc., 2001: pp. 162-168.

Wen et al., "Query Clustering in the Web Context," *Information Retrivial and Clustering*, Kluwer Academic Publishers, W. Wu and H. Xiong (Eds.) 2002: pp. 1-30.

Wen et al., "Query Clustering Using User Logs," *ACM Transactions on Information Systems*, Jan. 2002, vol. 20(1): pp. 59-81.

* cited by examiner

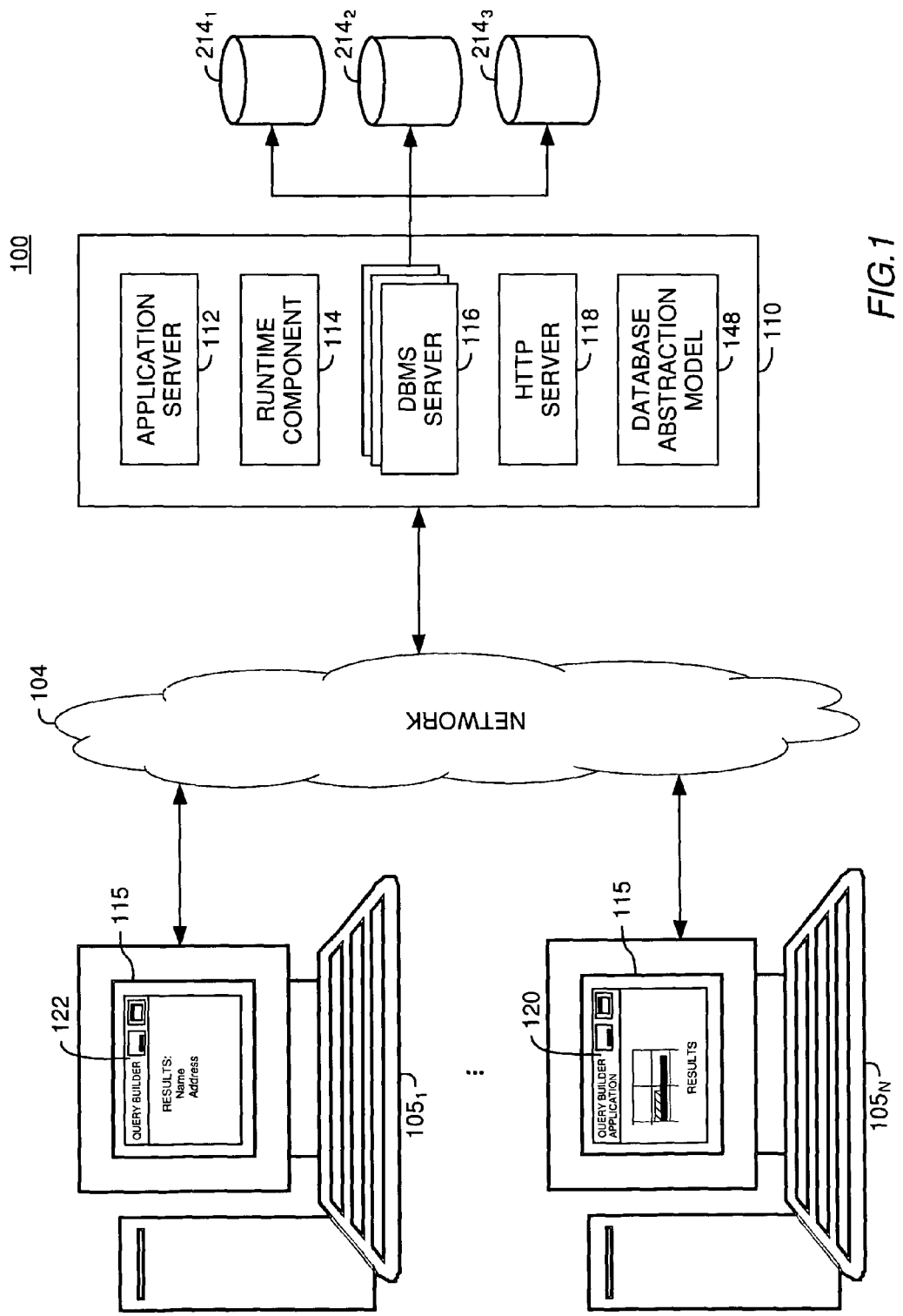

| DATABASE ABSTRACTION MODEL | — 148 |

| Model Entity : | |
|---|---|
| 222₁ — Patient : "Patient.PID" | — 220 |
| 222₂ — Employee : "Employee.EID" | |

| MODEL ENTITY RELATIONSHIPS | — 225 |

215₁ {
Field
  Name = "Test A Result"
  Access Method = "Simple"
  Table = "Test A"
  Column = "Value"
Timeline :
  Type = "Instance"
  Table = "Test A"
  Column = "Date"
— 208₆

215₂ {
Field
  Name = "Diagnosis Value"
  Access Method = "Simple"
  Table = "Diagnosis"
  Column = "Value"
Timeline :
  Type = "Instance"
  Table = "Diagnosis"
  Column = "Date"
— 208₇

215₃ {
Field
  Name = "Pregnancy"
  Access Method = "Filtered"
  Table = "Diagnosis"
  Column = "Value"
  Filter: "Value = 236"
Timeline
  Type = "Duration"
  Start : Table = "Diagnosis"
        Column = "Value"
  Filter: "Value = 29.2"
  End : Table = "Diagnosis"
      Column = "Date"
  Filter: "Value = 464"
— 208₈

215₄ {
Field
  Name = "Patient ID"
  Access Method = "Simple"
  Table = "Patient"
  Column = "PID"
Timeline
  Type = "Duration"
  Start : Table = "Patient"
        Column = "Birthdate"
  End : Table = "Patient"
      Column = "Deathdate"
— 208₉

QUERY INTERFACE

FILE   EDIT   VIEW

SELECT MODEL ENTITY BY: ☐ QUERY  ☐ PATIENTS  ☒ EMPLOYEE  ☐ HIRE DATE
QUERY BY: ☐ ALL  ☒ PERFORMANCE REVIEW  ☐ HIRE DATE

EMPLOYEE ID = 300 —1111
NAME = PARRISH, REBECCA
EMPLOYEE TYPE = DOCTOR

EMPLOYEE
☐ (1) Dr. JON
☐ (2) Dr. JULIE
☒ (3) Dr. REBECCA

1100

```
         PERFORMANCE
         REVIEW (PR)         ┌1110   PR                  CURRENT
                                                          DATE
HIRE DATE           PR    PR         PR    PUBLICATION
├─────────┼─────────┼─────┼──────────┼─────────┼─────────┤
1/1/2000   1/1/2001  1/1/2002  1/1/2003   10/10/2004
```

*FIG. 11*

ABSTRACT RECORD TIMELINE RENDERING/DISPLAY

CROSS-REFERENCE TO RELATED APPLICATIONS

This application is related to a commonly assigned, co-pending application U.S. patent application Ser. No. 10/083,075, filed Feb. 26, 2002, entitled "Application Portability and Extensibility through Database Schema and Query Abstraction," which is incorporated herein by reference in its entirety. This application is also related to commonly assigned, U.S. patent application entitled, "Timeline Condition Support for an Abstract Database," filed herewith Ser. No. 11/035,710, commonly assigned, U.S. patent application entitled "Abstract Query Plan," filed Dec. 6, 2004. Ser. No; 11/005,418, commonly assigned, U.S. patent application entitled "Abstract Records", filed herewith Ser. No. 11/035,563, and commonly assigned U.S. patent application entitled, "Logical Record Model Entity Switching", filed herewith Ser. No. 11/035,566, each incorporated herein by reference in their entirety.

BACKGROUND OF THE INVENTION

1. Field of the Invention

The present invention generally relates to computer databases. More specifically, the present invention relates to database applications for querying, displaying, and rendering data retrieved from a computer database.

2. Description of the Related Art

Databases are well known systems for information storage and retrieval. The most prevalent type of database used today is the relational database. A relational database stores data in a set of tables that may be reorganized and accessed in a number of different ways. A relational database management system (DBMS) uses relational techniques for storing and retrieving data.

Structured Query Language (SQL) is a well known database language that that includes commands for retrieving, storing, updating, and deleting data stored in a relational database. An SQL query is constructed as a text string that must strictly conform to the grammar requirements of the SQL query language. Further, an SQL query must be semantically correct to perform as desired by the user. That is, many syntactically correct SQL statements may fail to perform as desired due to semantic errors. Because of this complexity, database query applications are often used to assist a user in composing an SQL query of a relational database.

Although SQL provides a flexible and powerful method to query a relational database, average users are often interested in viewing groups of records as they relate to a particular entity or concept. That is, users are interested in viewing query results that display how different elements of data about the entity or concept are related to one another, and not simply in viewing rows of a relational table. Also, once query results are displayed, a user may desire to change the entity or concept used to organize and present the query results. For example, a user viewing query results from one perspective (e.g., patients) may, based on the actual query results, desire to view the same query results from another perspective (e.g., doctors).

Presenting data as query results in the form of a relational table, therefore, often fails to represent or display all the information users are interested in seeing. Further, facts that are related to a particular entity or concept often occur over time. Some events occupy a single point in time (e.g., an occurrence of a medical test with a test result value) while others occur over a duration (e.g., a medical condition or period of employment). Displaying query results as a relational table often fails to capture, display, or represent these attributes inherent in the query results. Moreover, the complexity of composing an SQL query using a relational database often discourages users from accessing and displaying desired query results.

Accordingly, there remains a need for techniques for conveying data stored in a database that is all related to a central entity or concept. Such techniques should capture and display the temporal relationships among data elements that are related to a central entity or concept being queried. Further, users should be allowed to switch from data displayed relative to one central entity or concept to other perspectives of the same data.

SUMMARY OF THE INVENTION

The present invention generally provides methods, systems, and articles of manufacture to present a user with query results retrieved from a database. Data is retrieved from the database relative to a central entity or concept being queried, referred to herein as a model entity, and rendered on a timeline display. In addition, once presented, query results related to a first model entity may include a second model entity. Embodiments of the invention provide for a user to switch the display presentation to the second model entity.

One embodiment of the invention provides a method of displaying physical data retrieved from an underlying physical database. The method generally includes providing a database abstraction model defining (a) a plurality of logical fields each having an access method that specifies at least a method for accessing the physical data associated with the logical field and (b) a plurality of model entities, wherein each model entity identifies (i) a set of logical fields each mapping to logically related physical data; and (ii) an identifier in the database used to identify instances of the model entity; wherein, for each model entity, a first logical field of the corresponding set of logical fields includes a timeline attribute defining a timeline for the model entity and wherein a second logical field of the corresponding set of logical fields includes a timeline attribute defining where the physical data associated with the second logical field occurs on the timeline. The method generally further includes receiving a request to display data related to an instance of one of the plurality of model entities and retrieving, from the database, physical data corresponding to the set of logical fields for the instance of the model entity. The method generally further includes displaying the timeline for the instance, based on of the timeline attribute for the first logical field, and displaying an event on the timeline, based on the timeline attribute for the second logical field, wherein the event corresponds to the physical data associated with the second logical field.

Another embodiment provides a system for accessing data in an underlying physical database. The system generally includes a database abstraction model defining (i) a plurality of logical fields, wherein each logical field specifies at least an access method mapping the logical field to data in the physical database, and wherein at least one logical field includes a timeline attribute that indicates where data elements retrieved for the logical field occur on a timeline, and (ii) a plurality of model entities each specifying an item of data in the database used to identify an instance of the model entity and further specifying an abstract record associated with the model entity, wherein the abstract record specifies a set of logical fields that map to data related to the model entity. The system generally further includes a database query application configured to display data related to the instance of the model entity, including the display of at least some of the data rendered on a timeline, relative to the model entity, and a runtime component configured (i) to receive, from the database query interface, a request to view the data related to the instance of the model entity, and in response, to generate and execute a physical query of the database, wherein executing the physical query retrieves a set of query results corresponding to the set of logical fields and (ii) to return the query results to the query building interface.

Another embodiment provides a program product on a computer readable medium containing a program. The program, when executed on a computer system provides (a) a plurality of logical fields each having an access method that specifies at least a method for accessing the physical data associated with the logical field, (b) a plurality of model entities, wherein each model entity identifies (i) a set of logical fields, from the plurality of logical fields, that map to logically related physical data; and (ii) an identifier in the underlying database used to identify instances of the model entity; wherein a first logical field of each set of logical fields for each model entity includes a timeline attribute defining a timeline for the model entity and wherein a second logical field of each set of logical fields for each model entity defines where the physical data associated with the second logical field occurs on the timeline for the model entity, and (c) a database query application configured to receive a request to display data related to an instance of one of the plurality of model entities. The program product further configured, in response to receiving the request, to retrieve, from a physical database, physical data corresponding to the set of logical fields for the instance model entity, and displaying the timeline for the instance, based on of the timeline attribute for the first logical field, and displaying an event on the timeline, based on the timeline attribute for the second logical field, wherein the event corresponds to the physical data associated with the second logical field.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof, illustrated in the appended drawings.

The appended drawings, however, illustrate only typical embodiments of the invention and, therefore, should not be considered limiting of its scope, for the invention may admit to other equally effective embodiments.

FIG. 1 illustrates a relational view of software and hardware components, according to one embodiment of the invention.

FIG. 6 illustrates an extension to the database abstraction model that includes model entity data and timeline attributes, according to one embodiment of the invention.

FIG. 9 illustrates an exemplary graphical user interface screen that displays related data elements rendered on a timeline, according to one embodiment of the invention.

FIG. 11 illustrates the graphical user interface screen first illustrated in FIG. 9, after switching model entitles, according to the method illustrated in FIG. 10.

DETAILED DESCRIPTION OF THE PREFERRED EMBODIMENTS

Figure 2A:
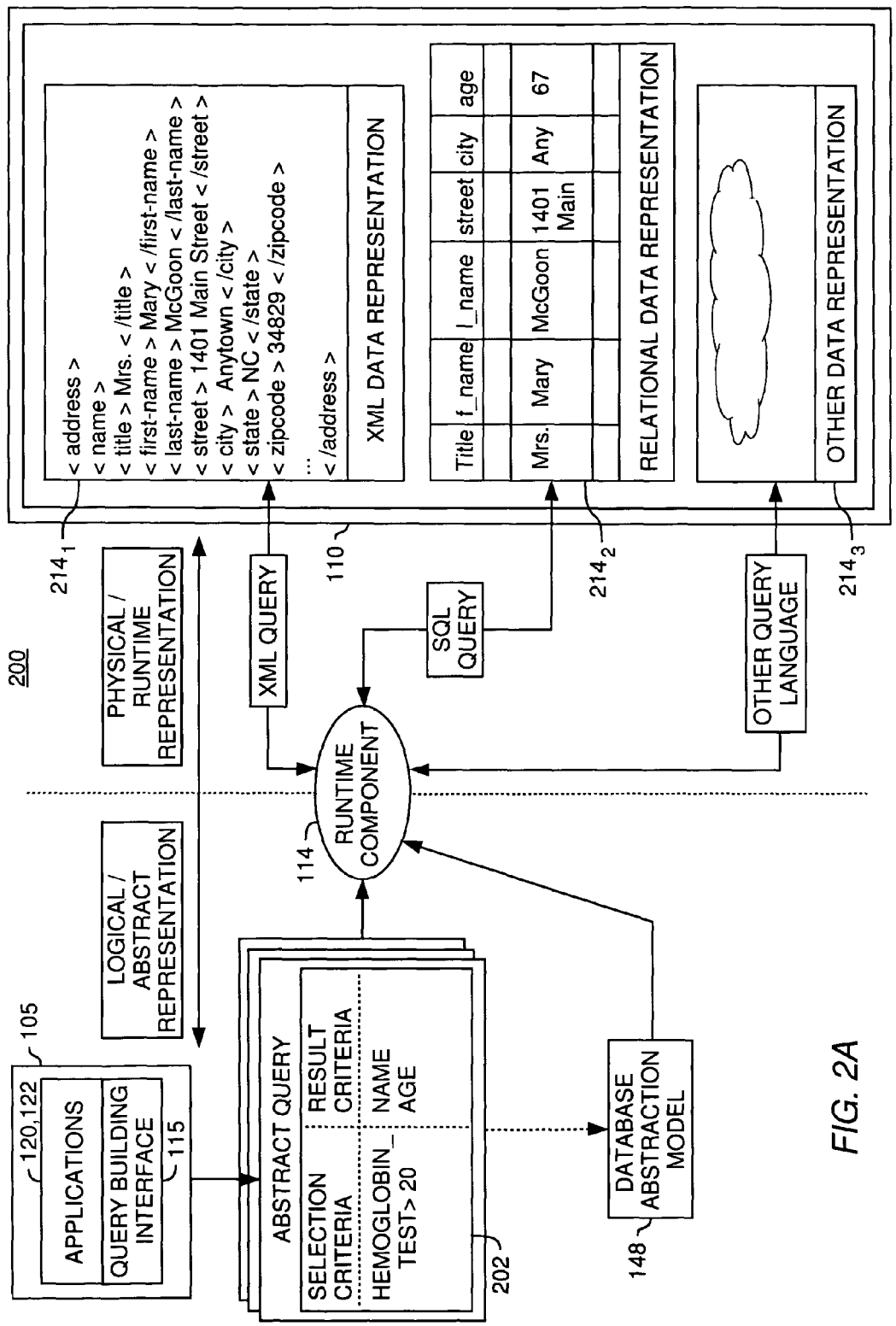
FIG. 2A illustrates a logical and physical representation of the database abstraction model environment, according to one embodiment of the invention.

Embodiments of the invention provide techniques for constructing a database abstraction model over an underlying physical database. Once constructed, users may interact with the database abstraction model, rather than the underlying physical database representation, to query the database and view query results. Embodiments of the invention display information retrieved from the underlying physical database that is related to a model entity. Examples of model entities include patients, doctors, employees, specimens, etc. More generally, a model entity identifies the logical focus, or the central entity, being queried by a user interacting with a query application. An abstract record identifies what data about each model entity is available to query using the database abstraction model. That is, the model entity specifies a "thing" for a user to query, and an abstract record specifies what data about the "thing" exists in the underlying database.

In one embodiment, data related to a specific instance of a model entity (e.g., a particular patient) is rendered on a timeline. Generally, data may be rendered on the timeline in two forms: instance data and duration data. Instance data is rendered as a single point on the timeline, and duration data is rendered over a segment of the timeline that includes a starting point and an ending point. The timeline used depends on the particular model entity. For example, a instance of the patient model entity might be rendered using individual's lifespan, or the duration of a particular hospital stay. The duration for an employee model entity could be rendered using an employment term.

Some model entities may be defined that include overlapping data in the underlying database. Thus, embodiments of the invention allow a user to switch the model entity being used to render query results. For example, a timeline display rendering data about a patient model entity may be switched to render data about the patient as an employee model entity (assuming that the particular patient was indeed both). The view of the data from the perspective of either model entity, employee or patient, is about the same individual. In one embodiment, the database abstraction model identifies when a model entity being viewed may be switched.

The following description first describes embodiments of a database abstraction model. In one embodiment, a set of model entities are defined for the database abstraction model that each correspond to an identifier (e.g., a primary key value of a relational table) in the underlying physical database. Each instance of the identifier in the underlying database corresponds to an instance of the model entity. As described in detail below, the model entity forms the root of a hierarchy of data that is related to the model entity. The hierarchy of data is referred to herein as an abstract record. After describing the database abstraction model environment, embodiments of the invention that extend the capabilities of the database abstraction model to include timeline attributes are described. Timeline attributes are then used to illustrate the display of data for an instance of a model entity rendered on a timeline. Lastly, techniques for model entity switching are described.

The Database Abstraction Model

Commonly assigned U.S. patent application Ser. No. 10/083,075 (the '075 application) entitled "Application Portability and Extensibility through Database Schema and Query Abstraction", discloses a framework for constructing a database abstraction model over a physical data storage mechanism. The framework of the '075 application provides a requesting entity (i.e., an end-user or front-end application) with an abstract representation of data stored in an underlying physical storage mechanism, such as a relational database. Using the database abstraction model, logical fields are defined that describe data stored in an underlying database. Users compose abstract queries by selecting logical fields and specifying conditions. In one embodiment of a database abstraction model, each logical field specifies an access method that specifies how to retrieve data from an underlying database system corresponding to the logical field. The system then retrieves data from the underlying database by generating and executing a resolved query from the abstract query. Examples of query processing techniques are described in a commonly assigned U.S. patent application, "Abstract Query Plan," filed on Dec. 6, 2004, incorporated herein by reference in its entirety.

Additionally, the following description references embodiments of the invention. The invention is not, however, limited to any specifically described embodiment. Rather, any combination of the following features and elements, whether related to a described embodiment or not, implements and practices the invention. Furthermore, in various embodiments the invention provides numerous advantages over the prior art. Although embodiments of the invention may achieve advantages over other possible solutions and the prior art, whether a particular advantage is achieved by a given embodiment does not limit the scope of the invention. Thus, the following aspects, features, embodiments and advantages are illustrative and are not considered elements or limitations of the appended claims except where explicitly recited in a claim. Similarly, references to "the invention" shall neither be construed as a generalization of any inventive subject matter disclosed herein nor considered an element or limitation of the appended claims except where explicitly recited in a claim.

One embodiment of the invention is implemented as a program product for use with a computer system such as, for example, the computer system 100 shown in FIG. 1 and described below. The program product defines functions of the embodiments (including the methods) described herein and can be contained on a variety of signal-bearing media. Illustrative signal-bearing media include, without limitation, (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed across communications media, (e.g., a computer or telephone network) including wireless communications. The latter embodiment specifically includes information shared over the Internet or other computer networks. Such signal-bearing media, when carrying computer-readable instructions that perform methods of the invention, represent embodiments of the present invention.

In general, software routines implementing embodiments of the invention may be part of an operating system or part of a specific application, component, program, module, object, or sequence of instructions such as an executable script. Such software routines typically comprise a plurality of instructions capable of being performed using a computer system. Also, programs typically include variables and data structures that reside in memory or on storage devices as part of their operation. In addition, various programs described herein may be identified based upon the application for which they are implemented. Those skilled in the art recognize, however, that any particular nomenclature or specific application that follows facilitates a description of the invention and does not limit the invention for use solely with a specific application or nomenclature. Furthermore, the functionality of programs described herein using discrete modules or components interacting with one another. Those skilled in the art recognize, however, that different embodiments may combine or merge such components and modules in many different ways.

Database Abstraction Model: Physical View of the Environment

FIG. 1 illustrates a networked computer system in a client/server configuration. Client computer systems $105_{1-N}$ include an interface that enables network communications with other systems over network 104. The network 104 may be a local area network where both the client system 105 and server system 110 reside in the same general location, or may be network connections between geographically distributed systems, including network connections over the Internet. Client system 105 generally includes a central processing unit (CPU) connected via a bus, to memory and storage (not shown). Each client system 105 is running an operating system, (e.g., a Linux® distribution, Microsoft Windows®, IBM's AIX® or OS/400®), FreeBSD, and the like) that manages the interaction between hardware components and higher-level software applications running on client system 105.

In one embodiment, a user establishes a network connection between client system 105 and server system 110. Such a connection may include a login process that includes a user authenticating their identity to the server system 110. For example, users may log into server system 110 by using a username and password.

The server system 110 may include hardware components similar to those used by client system 105. Accordingly, the server system 110 generally includes a CPU, a memory, and a storage device, coupled to one another by a bus (not shown). The server system 110 is also running an operating system, (e.g., a Linux® distribution, Microsoft Windows®, IBM's OS/400® or AIX®, FreeBSD, and the like) that manages the interaction between hardware components and higher-level software applications.

The client/server configuration illustrated in FIG. 1, however, is merely exemplary of one hardware/software configuration. Embodiments of the present invention may be implemented using other configurations, regardless of whether the computer systems are complex multi-user computing systems, such as a cluster of individual computers connected by a high-speed network, single-user workstations, or network appliances lacking non-volatile storage. Additionally, although described using a client/server configuration, embodiments using distributed computing, grid computing, and peer-to-peer processing techniques are contemplated.

In one embodiment, users interact with the server system 110 using a graphical user interface (GUI). In a particular embodiment, GUI content may comprise HTML documents (i.e., web-pages) rendered on a client computer system $105_1$ using web-browser 122. In such an embodiment, the server system 110 includes a Hypertext Transfer Protocol (HTTP) server 118 (e.g., a web server such as the open source Apache web-sever program or IBM's Web Sphere® program) configured to respond to HTTP requests from the client system 105 and to transmit HTML documents to client system 105. The web-pages themselves may be static documents stored on server system 110 or generated dynamically using application server 112 interacting with web-server 118 to service HTTP requests from client system 105.

Alternatively, or in addition, client application 120 may comprise a database front-end, or query application program running on client system $105_N$. The application 120 may allow a user to compose an abstract query and to submit the abstract query for processing to the runtime component 114. Application 120 or browser 122 presents a user with query-building interface 115. Query building interface 115 provides an interface for a user to interact with the database abstraction model environment to compose queries, view results, etc.

As illustrated in FIG. 1, server system 110 may further include runtime component 114, DBMS server 116, and database abstraction model 148. Each of these components may be a software program executing on the server system 110. The DBMS server 116 generally comprises a software application configured to manage databases $214_{1-3}$. Runtime component 114 is configured to generate a query consistent with the physical representation of the data contained in one or more of the databases 214. In other words, the runtime component is the "transformational engine" used to generate a physical query (e.g., an SQL statement) from an abstract query. In one embodiment, the runtime component 114 uses the access methods defined for the logical fields included in an abstract query to generate a physical query of the underlying physical database. The runtime component 114 may also be configured to return query results to the requesting entity, (e.g., using HTTP server 118).

Database Abstraction Model: Logical View of the Environment

FIG. 2A illustrates a plurality of interrelated components of the invention, along with the transformation between the abstract view provided by the database abstraction model (the left side of FIG. 2A), and the underlying physical database mechanisms used to store data (the right side of FIG. 2A). In one embodiment, a requesting entity (e.g., a user interacting with application 115 executing on client system 105) composes an abstract query 202 using query building interface 115. The resulting query is generally referred to herein as an "abstract query" because it is composed from logical fields rather than by direct references to data entities in underlying databases $214_{1-3}$.

In one embodiment, logical fields are defined by the database abstraction model 148. Depending on the access method specified for a logical field, the runtime component 114 may transform abstract query 202 into an XML query that queries data from database $214_1$, an SQL query of relational database $214_2$, or other query composed according to another physical storage mechanism (whether currently known or later developed).

Figure 2B:
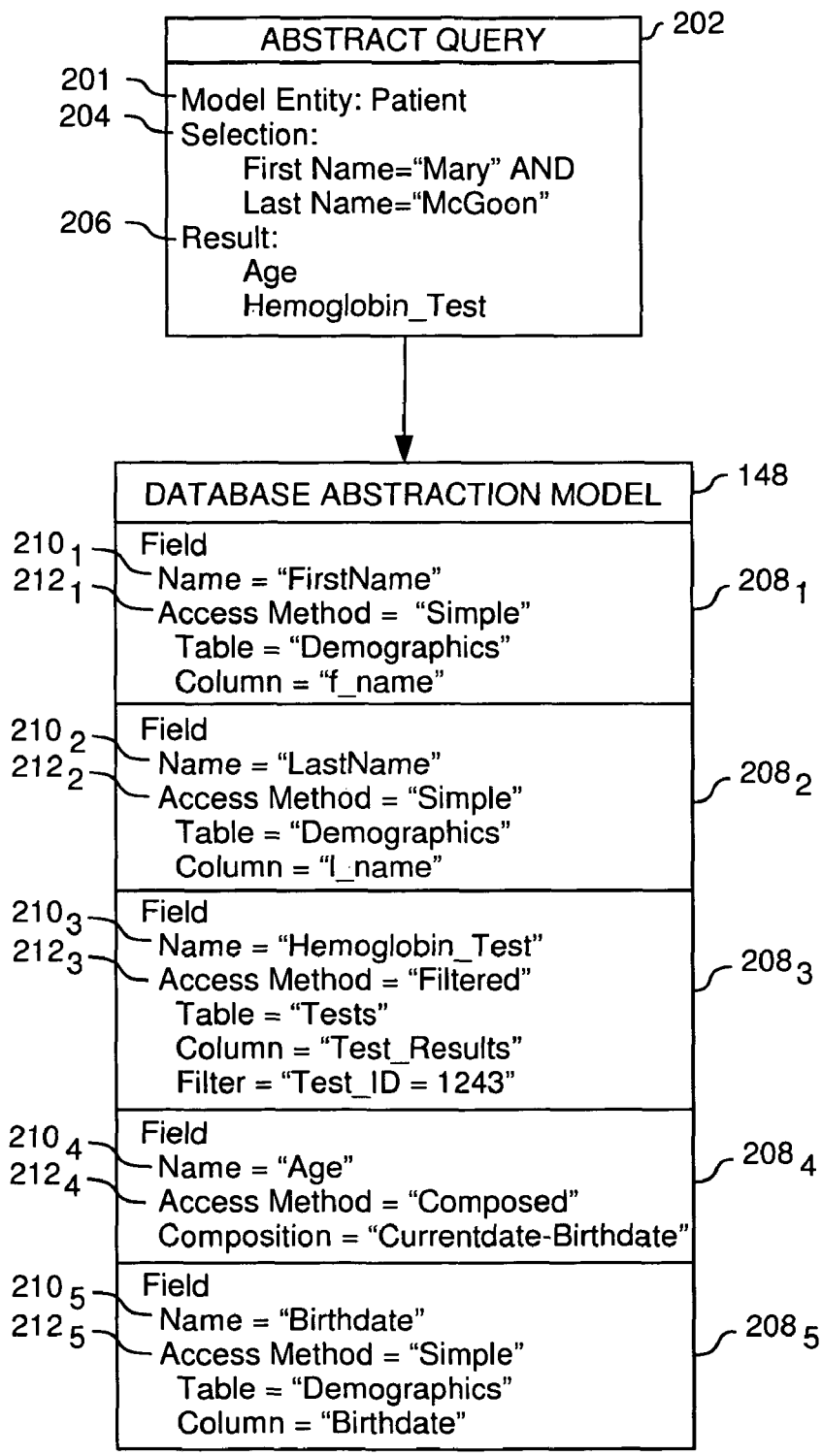
FIG. 2B illustrates an abstract query and corresponding database abstraction model, according to one embodiment of the invention.

FIG. 2B illustrates an exemplary abstract query 202. The query includes selection criteria 204 designed to retrieve information about a patient named "Mary McGoon." The particular information retrieved for the query is specified by result criteria 206. In this case, the query retrieves an age and test results for a hemoglobin test. The actual data retrieved may include data from multiple tests. That is, the query results may exhibit a one-to-many relationship between the named patient and the test results.

In addition, abstract query 202 specifies a model entity 201, as illustrated, a "patient" model entity. In one embodiment, a user specifies the model entity being queried as part of the query building process. What model entities are available is defined the database abstraction model 148. As described further below, model entities may be defined by additional metadata included in the database abstraction model 148. Additional examples of Model entities are described in commonly assigned U.S. patent application, Ser. No. 10/403,356, entitled "Dealing with Composite Data through Data Model Entities," incorporated by reference in its entirety.

FIG. 2B further illustrates an embodiment of a database abstraction model 148 that includes a plurality of logical field specifications $208_{1-5}$ (five shown by way of example). The logical fields shown in FIG. 2B illustrate a database abstraction model 148 constructed over a relational database (e.g., relational database $214_2$). The access methods included in field specifications 208 (or logical field, for short) maps the logical fields to tables and columns in an underlying relational database (e.g., database $214_2$ from FIG. 2A). As illustrated, each field specification 208 identifies a logical field name $210_{1-5}$ and an associated access method $212_{1-5}$. Depending upon the number of different types of logical fields, any number of access methods is contemplated. As illustrated in FIG. 2B, access methods for simple fields, filtered fields, and composed fields are provided.

Field specifications $208_1$, $208_2$, and $208_5$ each provide a simple access method $212_1$, $212_2$, and $212_5$, respectively. A simple access method specifies a direct mapping to a particular entity in the underlying physical database. For a relational database, the simple access method maps the logical field to a specific database table and column. For example, the simple field access method $212_1$ shown in FIG. 2B maps the logical field name $210_1$ "FirstName" to a column named "f_name" in a table named "Demographics."

Field specification $208_3$ exemplifies a filtered field access method $212_3$. Filtered access methods identify an associated physical entity and provide rules used to define a particular subset of items within the physical data representation. Consider, for example, a relational table storing test results for a plurality of different medical tests. Logical fields corresponding to each different test may be defined, and a filter for each different test is used to associate a specific test with a logical field. For example, the access method for filtered field $212_3$ maps to the "Test_Result" column of a "Tests" tests table and defines a filter "Test_ID='1243.'" Accordingly, the filtered field acts as selection criteria that selects a subset of data from a larger set, without the user having to know the specifics of how the data is represented in the underlying physical database, or having to specify the selection criteria as part of the query building process.

Field specification $208_4$ exemplifies a composed access method $212_4$. Composed access methods generate a return value by retrieving data from the underlying physical database, and performing operations on the data. In this way, information that does not directly exist in the underlying data representation may be computed and provided to a requesting entity. For example, composed field access method $212_4$ maps the logical field "Age" to another logical field $208_5$ named "birthdate." The logical field "birthdate" $210_5$ maps to a column in the demographics table. In this example, data for the "Age" logical field is computed by retrieving data from the underlying database using the "birthdate" logical field, and subtracting a current date value from the birth date value to calculate an "Age" value returned for the logical field $212_4$.

By way of example, the field specifications 208 of the data repository abstraction component 148 shown in FIG. 2B are representative of logical fields mapped to data represented in the relational data representation $214_2$. However, other instances of the data repository abstraction component 148 or other logical field specifications may map to other physical data representations (e.g., databases $214_1$ or $214_3$ illustrated in FIG. 2A).

An illustrative abstract query corresponding to abstract query 202 is shown in Table I below. In this example, the abstract query 202 is represented using extensible markup language (XML). In one embodiment, application 115 may be configured to generate an XML document to represent an abstract query composed by a user interacting with the query building interface 120 or web browser 122. Those skilled in the art will recognize that XML is a well known markup language designed to facilitate the sharing of structured text and information, other markup languages, however, may be used.

TABLE I

Query Example

```
001    <?xml version="1.0"?>
002    <!--Query string representation: (FirstName = "Mary" AND
003    LastName = "McGoon") OR State = "NC"-->
004    <QueryAbstraction>
005       <Selection>
006          <Condition internalID="4">
007             <Condition field="FirstName" operator="EQ"
008    value="Mary" internalID="1"/>
009             <Condition field="LastName" operator="EQ" value=
010    "McGoon" internalID="3" relOperator="AND"></Condition>
011          </Condition>
012       </Selection>
013       <Results>
014          <Field name="Age"/>
015          <Field name="Hemoglobin_test"/>
016       </Results>
017       <Entity name="patient" >
018          <EntityField required="Hard" >
019             <FieldRef name="data://Patient/PID" />
020             <Usage type="query" />
021          </EntityField>
022       </Entity>
023    </QueryAbstraction>
```

The abstract query shown in Table I includes a selection specification (lines 005-012) containing selection criteria and a results specification (lines 013-016). In one embodiment, a selection criterion consists of a field name (for a logical field), a comparison operator (=, >, <, etc) and a value expression (what is the field being compared to). In one embodiment, the result specification is a list of logical fields that are to be returned as a result of query execution. The actual data returned is consistent with the selection criteria. Line 17 identifies the model entity for the abstract query, in this case, a "patient" model entity. Thus, query results (e.g., result fields specified in lines 013-016) are returned for instances of a patient. Line 19 provides the identifier in the underlying database used to identify instances of the model entity. In this case, instances of the "patient" model entity are identified using values from the "Patient ID" column of a patients table. Database Abstraction Model: Model Entities and Abstract Records The foregoing description discussed embodiments of a database abstraction model 148 constructed over an underlying physical database. The database abstraction model 148 defines a plurality of logical fields 208 with access methods that each map to data in an underlying database 214. Users compose an abstract query by selecting logical fields and conditions. A runtime component 114 may be configured to receive an abstract query and, in response, generate a resolved query issued to the underlying physical database. In addition, query applications may be configured to retrieve data corresponding to a logical field in response to a user interacting with query interface 115.

Figure 7:
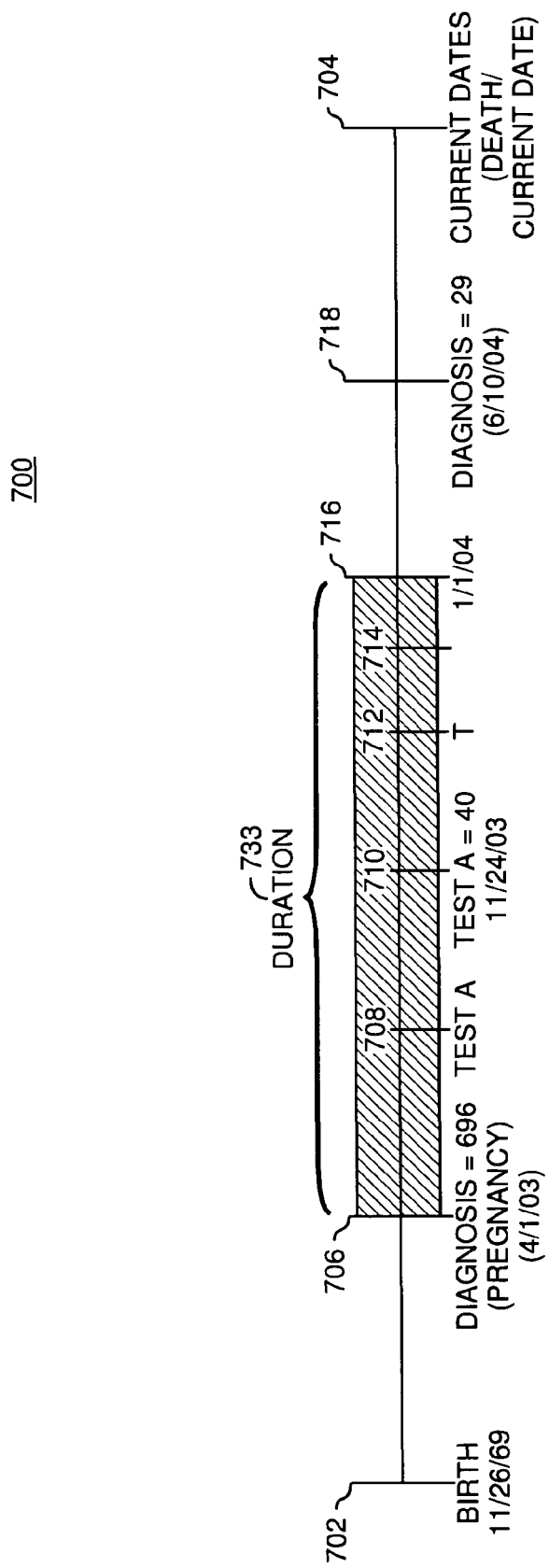
FIG. 7 illustrates a graphical representation of a timeline display, according to one embodiment of the invention.
Figure 8:
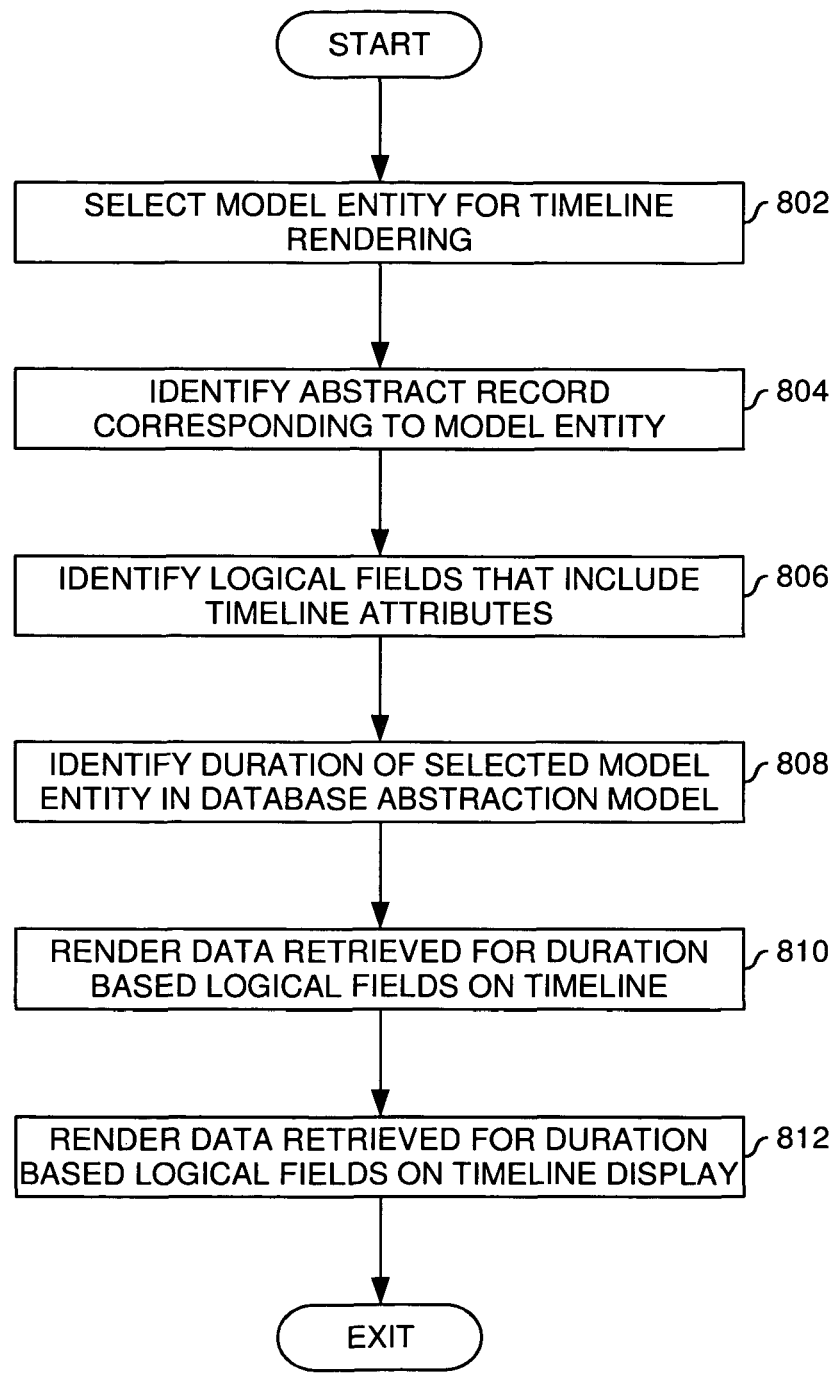
FIG. 8 illustrates a method for rendering related data elements on a timeline display, according to one embodiment of the invention.
Figure 9:
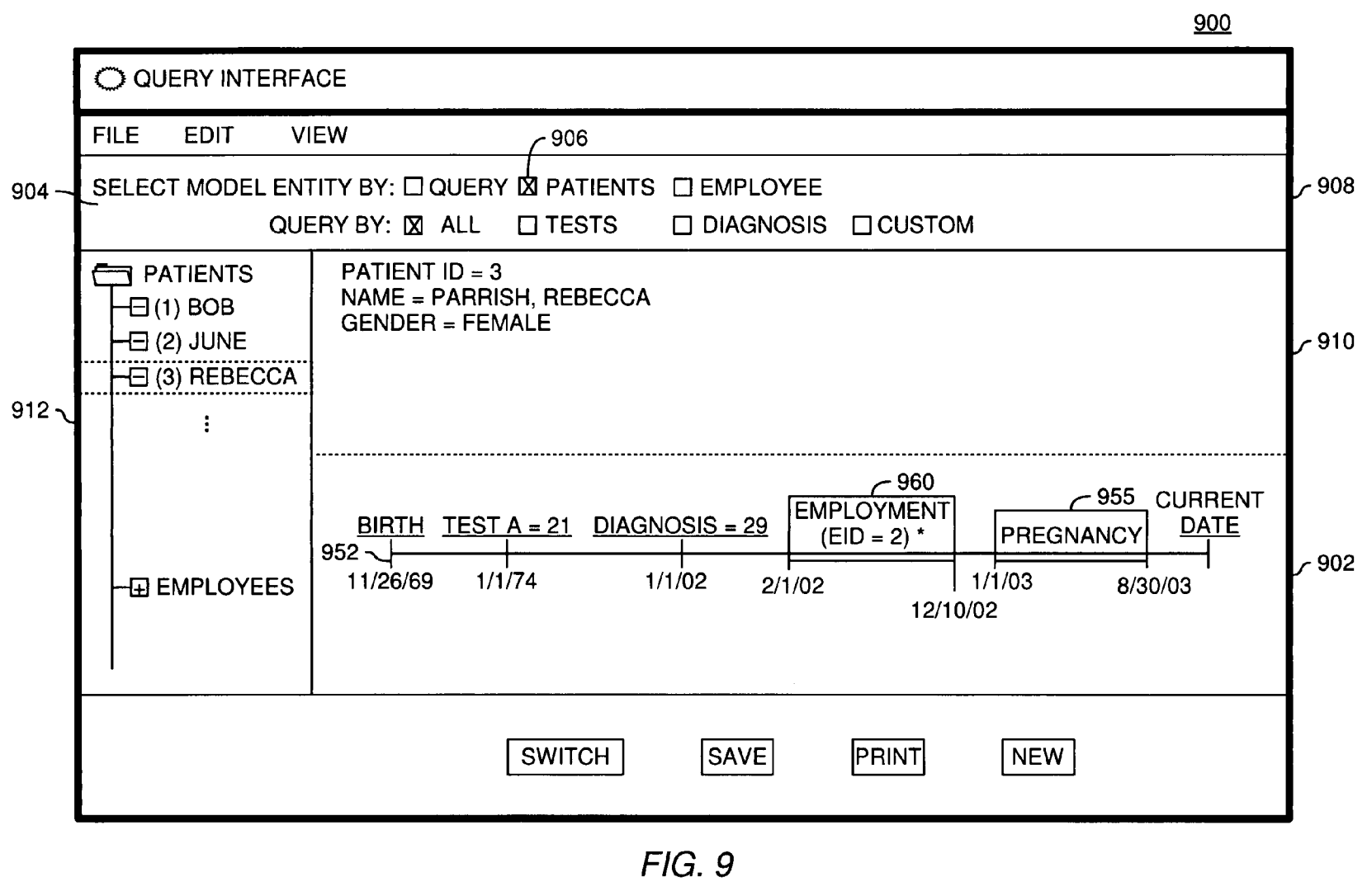
Figure 10:
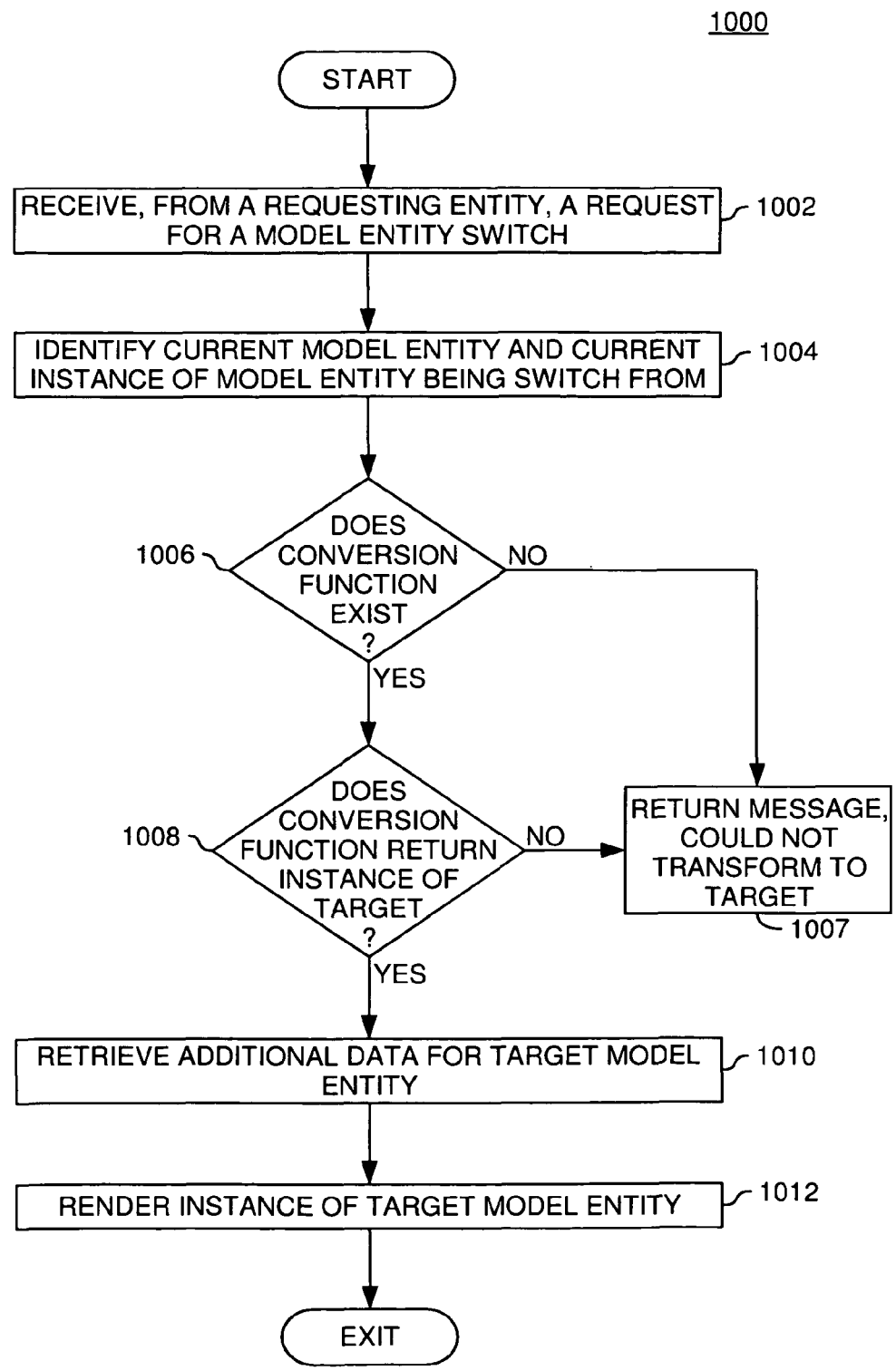
FIG. 10 illustrates a method for switching from an original model entity to a target model entity, according to one embodiment of the invention.

In the following description, FIGS. 3-6 illustrate a database abstraction model constructed over an existing physical database system. This database system is used to construct a database abstraction model that provides a "patient" model entity, and an "employee" model entity. For each model entity, an abstract record composed from group of logical fields is defined. Subsequently, FIGS. 7-9 illustrate abstract record display and timeline rendering, and FIGS. 10-11 illustrate model entity switching.

Figure 3A:
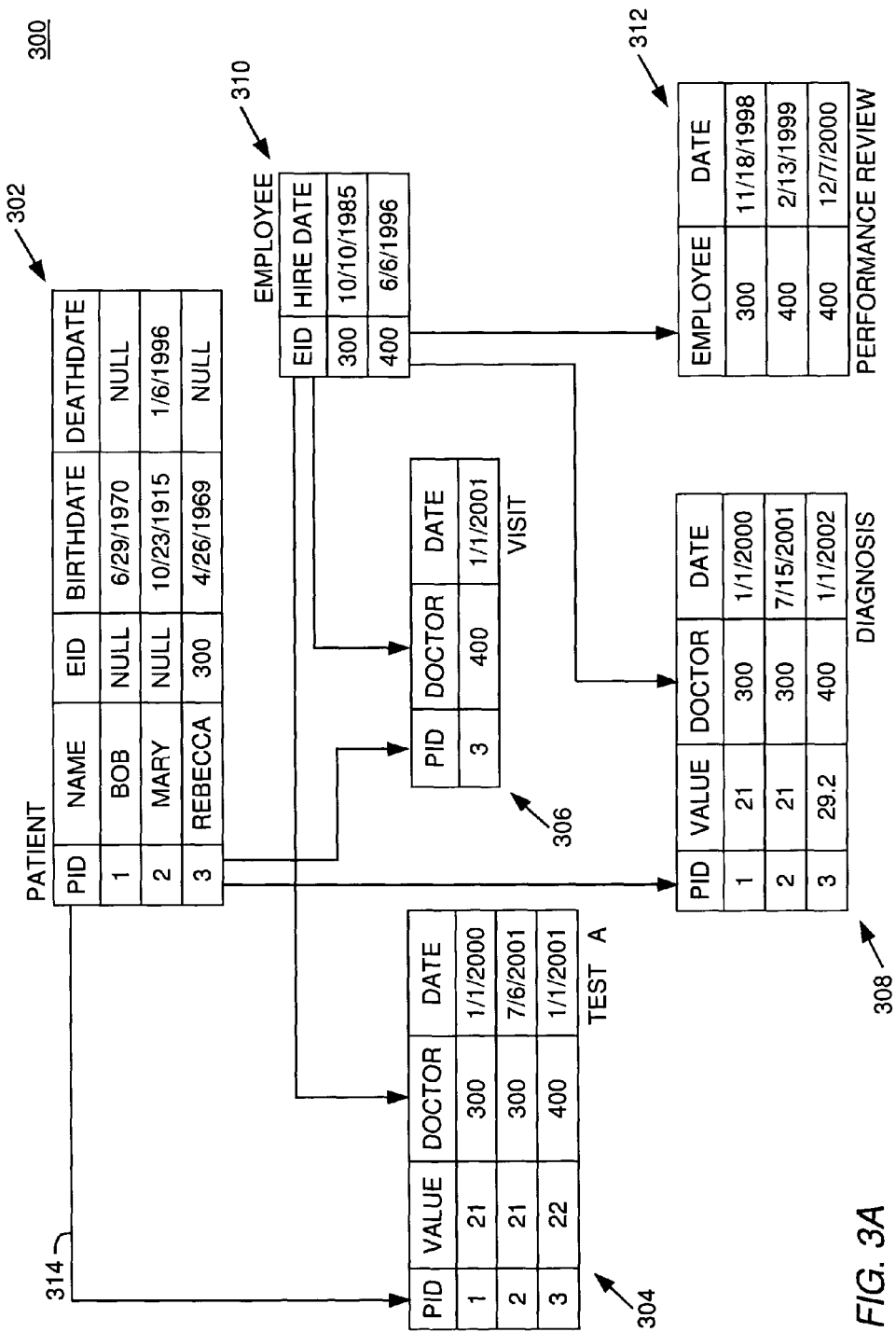
FIGS. 3A-3C illustrate a relational database schema (FIG. 3A) and a set of model entity relationships (FIGS. 3B-3C), according to one embodiment of the invention.

FIG. 3A illustrates an exemplary relational database 300. As illustrated, database 300 includes a group of relational tables and relationships between tables. Each table is used to store a set of related data about both patients and employees. For example, patient table 302 includes a patient identifier (PID) column used to identify each individual patient, and also includes additional columns that store data about each patient. Specifically, patient table 302 includes the name, birthdate, death date, and employee ID columns. Similarly, an employee table 310 contains an employee identifier (EID) and related columns. Also illustrated is a test A table 304, a visit table 306, a diagnosis table 308, and a performance review table 312.

Connecting the relational tables are lines used to identify a relationship between two tables. For example, the PID column in patients table 302 is related to the PID column in the test A table 304. That is, if a PID value is the same in both columns, then data from the rows of each table correspond to the same patient (or object). Line 314 indicates this relationship. Relationships between the columns of other tables in database 300 are similarly illustrated.

Figure 3B:
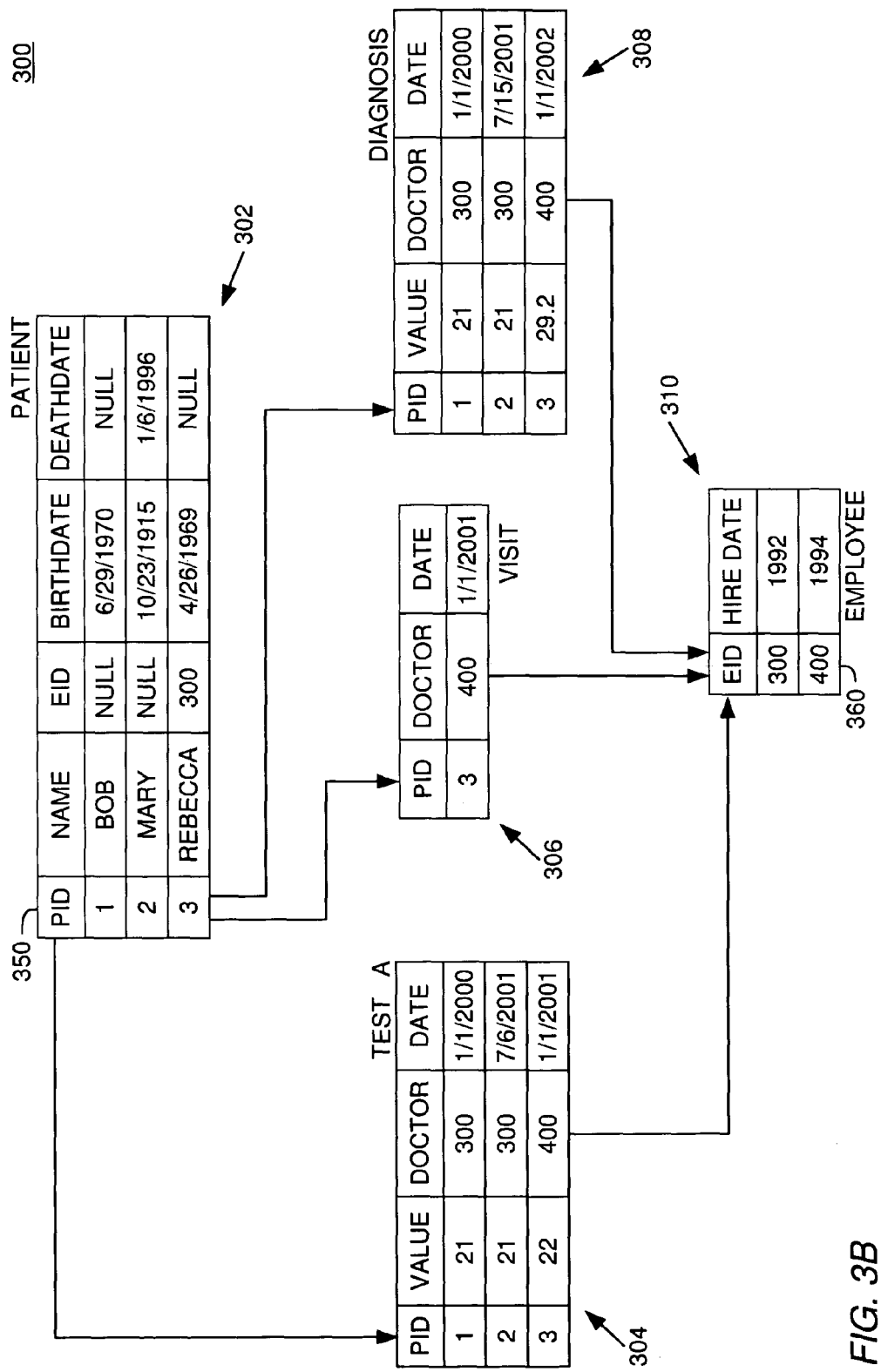
Figure 3C:
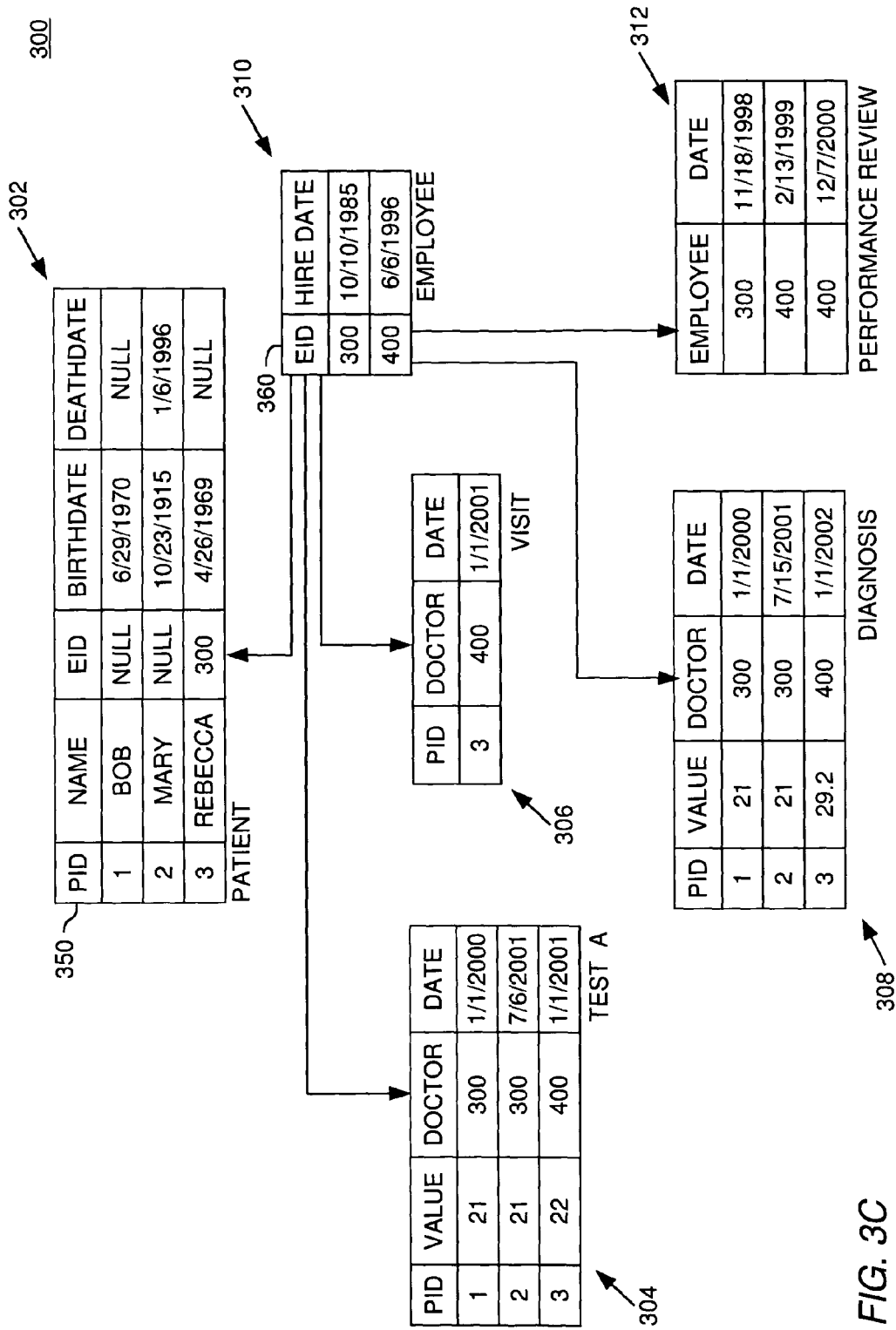

In one embodiment, the database abstraction model 148 includes a definition for each model entity that maps to an identifier in the underlying database. The identifier is used to distinguish different instances of the model entity. FIGS. 3B and 3C each illustrate a portion of database 300 that includes only the tables and relationships needed to define a "patient" model entity and an "employee" model entity, respectively. In this example, instances of the "patient" model entity are identified in the database 300 using the PID primary key column 350 of table 302 (FIG. 3B), and employees are identified using the EID column 360 of table 310 (FIG. 3C). Extending out from each model entity are other relationships to other tables in database 300 related to the "patient" model entity (FIG. 3B) and the "employee" model entity (FIG. 3C). Table II illustrates each relationship for the "patient" model entity and the "employee" model entity, respectively.

TABLE II

Model Entity Relationships
DATABASE ABSTRACTION MODEL

Patient Model Entity Relationships

Patient.pid (1) → TestA.pid (many)

TABLE II-continued

Model Entity Relationships
DATABASE ABSTRACTION MODEL

Patient.pid (1) → visit.pid (many)
Patient.pid (1) → diagnosis.pid (many)
TestA.doctorID (1) → Employee.EID (1)
Visit.doctorID (1) → Employee.EID (1)
Diagnosis.doctorID (1) → Employee.EID (1)
Employee Model Entity Relationships Employee.EID (1) → PerformanceReview.EID (many)
Employee.EID (1) → Diagnosis.Doctor (many)
Employee.EID (1) → Visit.Doctor (many)
Employee.EID (1) → TestA.Doctor (1)
Patient.pid (1) → TestA.pid (1)
Patient.pid (1) → visit.pid (1)
Patient.pid (1) → diagnosis.pid (1)

Each model entity relationship specifies a relationship between two tables in the underlying database 300. Collectively, the "patient" model entity relationships specify all of the tables in database 300 that contain data related to the "patient" model entity. For example, a patient may have data in the diagnosis table. Thus, the model entity relationship "Patient.pid (1)→diagnosis.pid (many)" is included in the "patient" model entity relationships. Patients do not, however, have any data stored in the performance review table, and accordingly, no relationship to this table is defined in the "patient" model entity relationships. As a consequence, the patient model entity may not be queried to retrieve data from performance review table 312. The performance review table 310 is included, however, in the model entity relationships for the "employee" model entity, because employees have performance reviews. In addition, each model entity relationship may indicate whether the relationship between the tables is a one-to-one or one-to-many relationship. For example, each relationship illustrated in Table II includes a (1) or (many) indicator for the two database columns.

In addition, the arrows in the model entity relationships in Table II, above, illustrate that model entity relationships are directional. Model entity relationships flow from the model entity table to other tables in the database. For example, using the "patient" model entity relationships in Table II, each instance of the "patient" model entity may have many diagnoses, each one made by a different doctor. The converse, however, does not hold. For example, doctors do not have a diagnosis, and a diagnosis does not have a patient. Stated another way, the "patient" model entity is queried to find diagnoses, not the other way around. A "diagnosis" model entity, however, could include such a relationship. To further illustrate this aspect, consider the one-to-many nature of the two model entities. An instance of the "patient" model entity includes one patient that may have many diagnoses. An instance of the "diagnosis" model entity would provide one diagnosis related to many patients (e.g., all of the patients diagnosed with condition X). Thus, model entity relationships not only identify what data is available for the model entity in the underlying database, they describe the hierarchy of data available in the database relative to the model entity. Additional examples of Model entities are described in a commonly assigned, pending application entitled "Dealing with Composite Data through Data Model Entities," Ser. No. 10/403,356, filed on Mar. 31, 2003, and incorporated by reference herein in its entirety.

In one embodiment, logical fields 208 may be defined that map to the columns of tables specified by the model entity relationships. For example, the "patient" model entity relationships illustrated in Table II reference the patient table 302, the test A table 304, the visit table 306, the diagnosis table 308, and the employee table 310. In addition, a logical field is defined that maps to the column used to identify instances of the model entity. For example, a Patient ID logical field maps to the PID column of the patient table. Also, a logical field included in the abstract record for one model entity may also be the model entity field for a different model entity. Model entity fields are used as part of model entity switching techniques described below in greater detail.

Together, the collection of logical fields created for a model entity form an abstract record. Typically, an abstract record identifies the scope of data about a model entity that may be queried by users of the database abstraction model 148 using logical fields 208. Additional examples of abstract records are described in commonly assigned, co-pending, U.S. patent application entitled, "Abstract Records," filed herewith, 11/035,563 which is incorporated by reference herein in its entirety.

Figure 4:
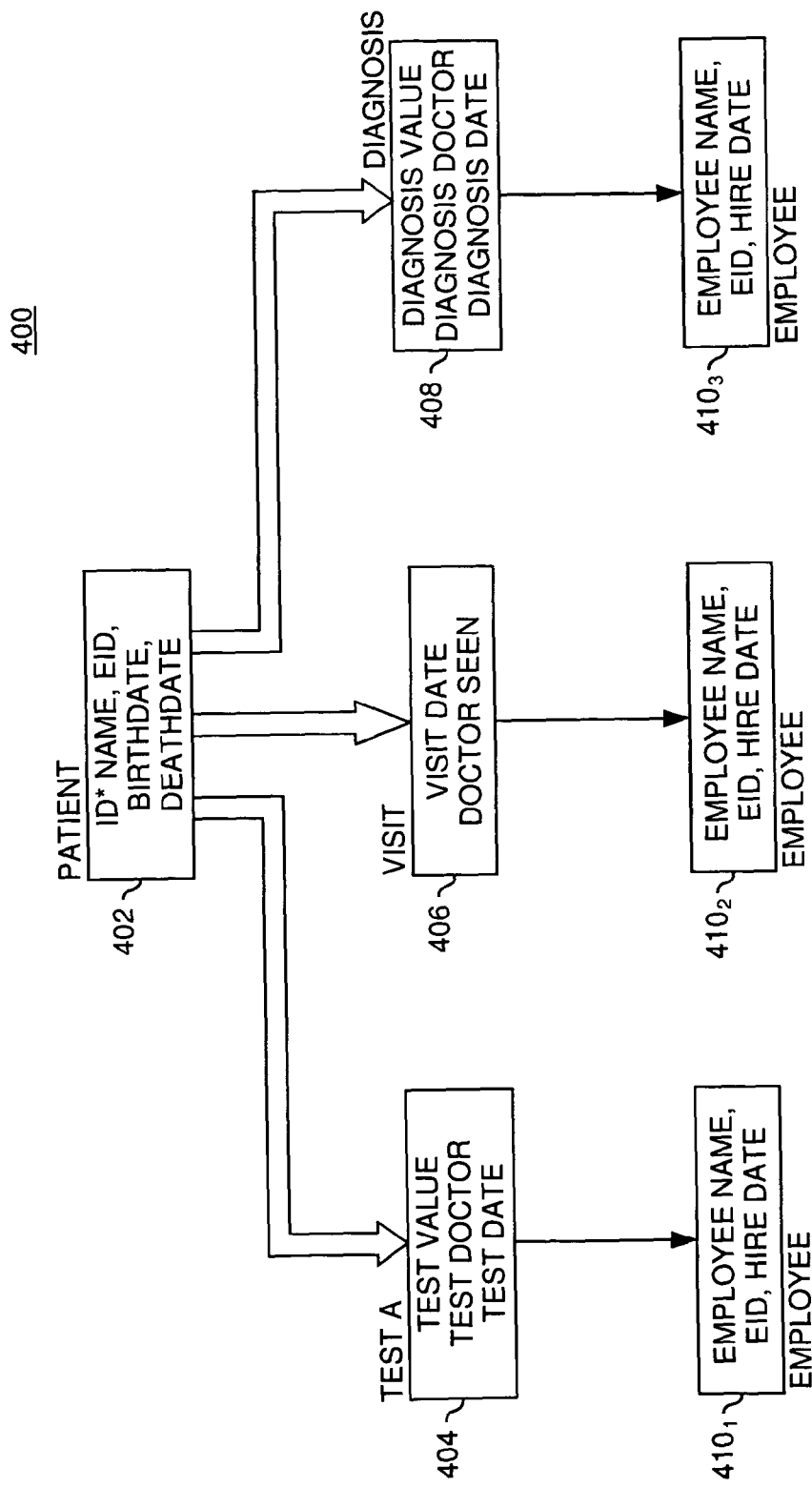
FIG. 4 illustrates an abstract record that includes a group of logical fields related to a model entity, according to one embodiment of the invention.

FIG. 4 illustrates a graphical representation of an abstract record 400 for the "patient" model entity. Abstract record 400 is represented as a hierarchy of nodes. In one embodiment, each node is related to a table specified in the model entity relationships illustrated in Table II. The nodes are connected using the directional aspect of the model entity relationships, and the node representing the table used to identify the model entity is placed at the root of the hierarchy. Further, each node identifies logical fields mapping to columns in the table represented by the node. For example, at the root of abstract record 400 is the patient node 402. Node 402 includes the model entity logical field "ID", and includes logical fields that map to columns of the patients table 302. Thus, logical fields "Patient ID," "name," "EID", "birthdate," and "death date," are included. Extending from the model entity node 402 are branches to other nodes that identify the logical fields related to the model entity. Test A node 404 includes logical fields for "test value," "test doctor," and "Test date." Similarly, diagnosis node 408 includes logical fields for a "diagnosis value," "diagnosis date," and a "diagnosis doctor." (i.e., the doctor making the related diagnosis). Visit node 406 includes logical fields "visit," "date," and "treating doctor."

As illustrated, the branches from the patient node 402 to nodes 404, 406, and 408, are all represented with a double line segment indicating a one-to-many relationship between the nodes connected by a branch. Further down in the hierarchy are one-to-one relationships from test A node 404, visit node 406, and diagnosis node 408 to copies of the employee node 410. The employee node includes the logical fields of "employee name," "employee identifier," and a "hire date" logical field.

Although illustrated three times, the logical fields all map to data in the employee table 310. The employee node is replicated, however, because the model entity relationships refer to the employee table in more than one relationship. For example, an instance of the patient model entity may refer to multiple diagnoses where each diagnosis is made by a doctor. Data about the doctor making each diagnosis is contained in the employee table 310. Node $410_1$ of the abstract record identifies what logical fields are used to obtain this data. At the same time, a patient may have data related to multiple hospital visits where data for each visit includes a treating doctor. Data about the treating doctor is also is contained in the employee table 310. Node $410_2$ of the abstract record identifies what logical fields are used to obtain this data. The replicated nodes separate data related to a diagnosis from data related to a visit. Thus, even though the logical fields and the underlying table are the same for both nodes, the abstract record separates data according to the model entity relationships.

An abstract record for the "employee" model entity may be similarly constructed by defining logical fields (if not already created for the "patient" model entity) that map to the columns of tables referenced by the "employee" model entity relationships.

Figure 5:
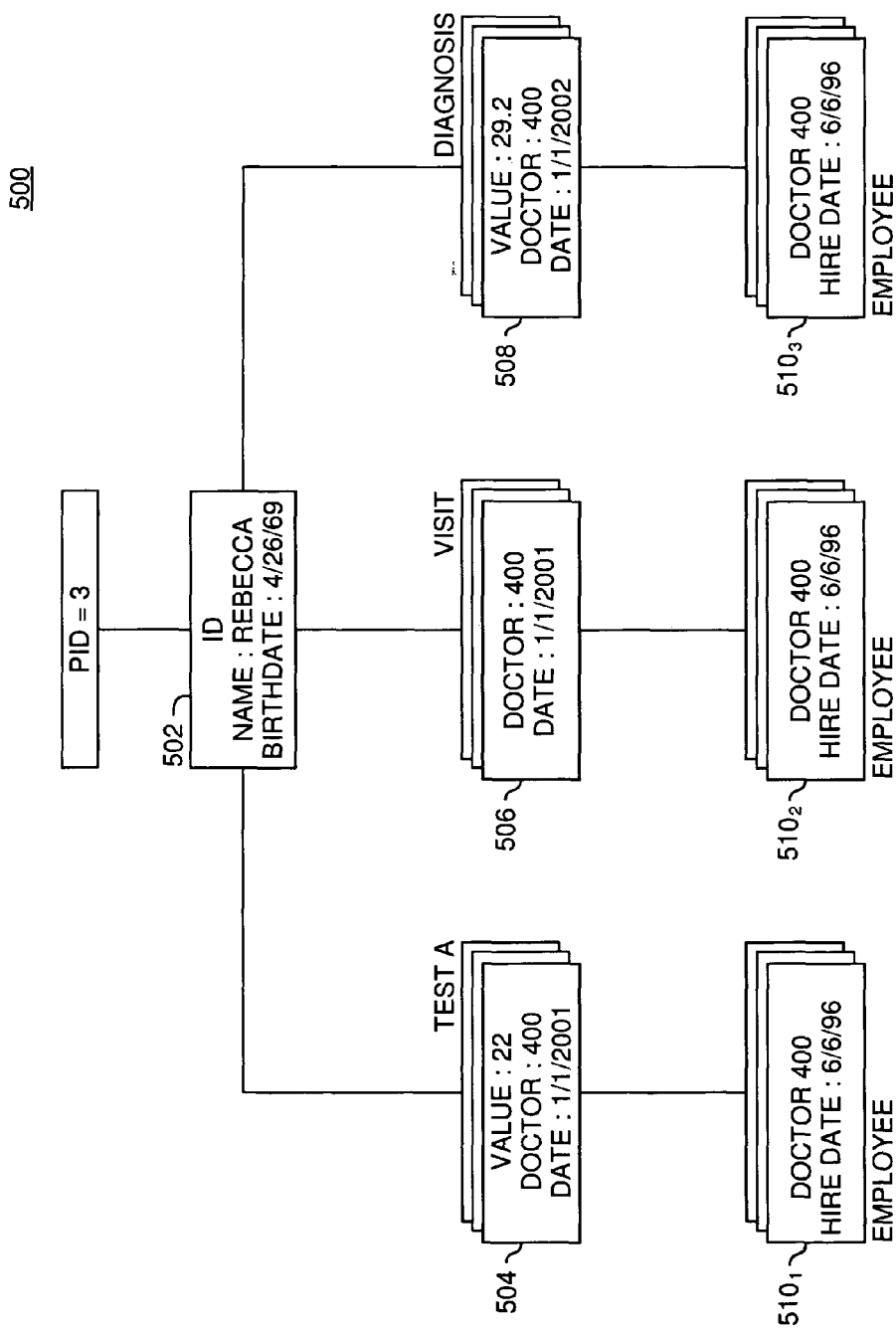
FIG. 5 illustrates an instance of an abstract record populated with data from the underlying database illustrated in FIG. 3A, according to one embodiment of the invention.

As described above, the logical field that maps to a model entity may be placed at the root of an abstract record. The abstract record, in turn, specifies the logical fields that map to data related to the model entity, as well as the relationships between logical fields, relative to the model entity. Using the example model entity "patients," each instance of the model entity represents a particular patient. And the abstract record for an instance of the model entity contains all of the data related to that patient. For example, FIG. 5 illustrates abstract record 500 for a specific patient with a "PID" value of "3." Each node of the abstract record 500 is populated with the data retrieved using the logical fields identified for the node in FIG. 4. The data retrieved corresponds to the particular model entity ("PID=3"). Thus, test A node 404 contains data retrieved using the logical fields specified in abstract record node 404 related to test A results for the "PID=3" instance of the "patient" model entity. Other nodes are similarly populated using data retrieved using the logical fields in abstract record 400.

In one embodiment, a user specifies a model entity (or composes a query to identify a set of model entities). Once a specific model entity is selected, runtime component 114 may be configured to retrieve data related to the instance of the model entity from database 300. In one embodiment, the runtime component 114 may retrieve the entire abstract record for a particular model entity. Alternatively, a user may request to view only a portion of the abstract record for a model entity (e.g., by specifying results criteria in an abstract query).

Database Abstraction Model: Abstract Record Timeline Rendering and Display

Embodiments of the invention may be used to display instances of a model entity rendered on a timeline. In one embodiment, timeline attributes are added to the logical fields included in the database abstraction model 148. Timeline attributes are used to display data retrieved for an instance of a model entity rendered on a timeline.

FIG. 6 illustrates an extended database abstraction model 148. In this example, model entity section 220 identifies the two model entitles. "Patient" model entity $222_1$ specifies that instances of the "patient" model entity may be identified in reference to a PID column of the patients table 302, and that instances of the employee model entity $222_2$ may be identified in reference to the EID column of the employee table 310. Model entity relationships section 225 includes the model entity relationships in the underlying database defined for each model entity. Thus, Table II, above, is included in section 225.

Logical field specifications $208_{6-9}$ illustrate logical fields related to the "patient" model entity $222_1$ that include timeline attributes 215. In one embodiment, logical fields may specify two types of timeline attributes, instance and duration. First, a timeline instance event occupies a single point on the timeline. Data retrieved for a logical field that specifies an instance type timeline attribute is placed on the timeline at a point determined using timeline attributes 215. Logical fields $208_6$ and $208_7$ each specify instance type timeline attributes $215_1$ and $215_2$. Logical field $208_6$, "test A result," maps to test results stored in the test A table 304. Timeline attributes $215_1$ indicates that data retrieved for logical field $208_6$ may be placed on a timeline using the "test date" column from the "test A" table. Similarly, timeline attributes $215_2$ places diagnosis dates on the timeline using a diagnosis date stored in diagnosis table 308.

Second, duration type timeline attributes identify a start time and (optionally) an end time associated with data retrieved for the logical field. If no end time is provided (e.g., where the duration event has not yet terminated), then the current date may be used. Thus, duration events may be open ended on a timeline. Data retrieved for a duration type logical field specifies the period of time for the duration event. For example, logical fields $208_8$ and $208_9$ include attributes $215_{3-4}$ that define a span of time on a timeline. Patient ID field $208_9$ includes timeline attributes $215_4$ indicating the duration for a patient is his or her lifetime. In one embodiment, because the PID value defines each instance of a "patient" model entity, data retrieved for each instance of the "patient" model entity are rendered relative to the duration of the specific instance.

Logical field $208_8$ illustrates another example of a logical field that includes duration type timeline attributes $215_3$. Timeline attributes $215_3$, specifies that the logical field $208_8$ "pregnancy" occurs on a timeline starting at a diagnosis date stored in the diagnosis table. The "magnitude" (i.e., the length of the duration event) is also specified by timeline metadata $215_3$. The magnitude associated with the "pregnancy" logical field $208_8$ begins with the diagnosis date and ends with a delivery date. In this illustration, the "pregnancy" duration event start and end dates are found in database 300 using diagnosis codes stored in the diagnosis table.

Once timeline attributes 215 are defined for logical fields 208, data retrieved for these logical fields may be displayed using a timeline rendering. In one embodiment, runtime component 114 may be configured to retrieve a set of abstract records corresponding to instances of a model entity. As described above, a model entity logical field (e.g., field $208_9$) includes timeline attributes (e.g., timeline attributes $215_4$) that specify a duration on the timeline for instances of the model entity. Events related to the model entity are placed within the timeline associated with the model entity. For example, the "patient" model entity includes duration timeline attribute $215_3$ specifying a patient's lifespan as the duration. Accordingly, data related to the model entity may be plotted anywhere on a timeline beginning with a patient's birth date and ending with a patient's death date. A logical field for the "employee" model entity might include timeline attributes specifying employment term as the timeline duration for an employee. Thus, data retrieved for an instance of the "employee" model entity would be displayed on a timeline matching the employment term for the particular employee.

FIG. 7 illustrates an exemplary timeline rendering for an instance of the "patient" model entity. As illustrated the timeline display is used to render the abstract record corresponding to the "PID=3" instance of the "patient" model entity. As illustrated, timeline 700 begins with the birthdate 11/26/69 and terminates with the current date (indicating that the patient is still living). Instance events 708-718 illustrate data about the model entity being rendered. Each instance event specifies the date, along with the data value, for the instance event retrieved for the model entity. Accordingly, test A result values and diagnosis values are all rendered on the timeline based on when the event occurred. In addition, duration 720 illustrates a duration type timeline event. The shaded area 733 indicates the segment of time corresponding to the duration of the event.

FIG. 8 illustrates a method 800 for displaying data elements from an abstract record for an instance of a model entity, according to one embodiment of the invention. The method begins at step 802 where a user selects a model entity to be rendered on a timeline display. In one embodiment, this may occur by providing a user with an indication of model entities that have been defined for the database abstraction model 148. In such a case, a user may simply select one from a list of model entities, and the runtime component 114 retrieves the instances of the selected model entity that occur in the underlying database. For example, using the "patient" model entity, a list of patient IDs (or names) may be displayed allowing a user to select a specific model entity.

Alternatively, a user may compose an abstract query about a model entity by specifying a set of logical fields and selection criteria. In response, the runtime component 114 may generate a query of the underlying database to retrieve data consistent with the abstract query. In one embodiment, these results are returned as a set of instances of the model entity. In such a case, only the selected results fields for the abstract query may be displayed on the timeline representation.

In another embodiment, a user may be presented with a customized query application used to interrogate the database abstraction model 148 for data related to a specific model entity. For example, using the same underlying physical database, a query interface 115 may be used to present doctors with an interface to patient data. Thus, the interface 115 would allow a user to compose and issue queries about the "patient" model entity. Only the data in the underlying database "visible" through the "patient" model entity and corresponding abstract record would be available to query through the interface 115. Another interface 115 might be provided to a staff review board to query a "doctors" model entity, or an interface 115 to query the "employee" model entity for a human resources department.

However selected, at step 804, the model entity relationships defined for the selected model entity are identified. For example, the runtime component 114 may be configured to identify an abstract record associated with the model entity. At step 806, the method 800 determines which logical fields in the abstract record for the selected model entity include timeline attributes. In other words, to present data on the timeline, the logical field must include timeline attributes that specify how data retrieved for the logical field is plotted on the timeline. Data for other logical fields may also be returned and presented to a user, but is not displayed on the timeline. At step 808, the method 800 determines the timeline boundaries for the selected model entity using the duration timeline attributes 215 for the model entity logical field. For example, for an instance of the "patient" model entity, the timeline duration corresponds to the lifespan of the specific patient being rendered. And timeline attributes $215_4$ indicate this duration for the Patient ID logical field $208_9$.

At step 810, data for logical fields with instance based timeline metadata is retrieved from the underlying database. For example, the test results logical field $208_6$ retrieves data specifying test results, and each test includes an instance date (specified by timeline attributes $215_1$). The test values retrieved for the logical field are plotted against a timeline for the selected instance of the model entity. Data from other instance based logical fields are plotted similarly on the timeline. At step 812, data for logical fields with duration timeline attributes are retrieved from the underlying database and displayed on the timeline.

FIG. 9 illustrates an exemplary graphical user interface screen 900 that displays data elements rendered on timeline 902, according to one embodiment of the invention. As illustrated, the screen 900 includes model entity selection area 904 that displays model entities that may be rendered on timeline 902 using query interface 115. As illustrated, the selection area 904 includes a checkbox 906 currently selected to display "patient" model entities. "Query by" section 908 allows a user to specify what data from the abstract record for the selected "patient" model entity is displayed in query results section 910 and on timeline 902. Model entity section 912 indicates instances of the selected model entity rendered in display area 910. Query results section 910 displays data for a model entity that includes both data rendered on timeline 902 and data that is not rendered on timeline 902. For example, name and gender data are not rendered on timeline 902 because they do not change over time.

As illustrated, FIG. 9 displays the model entity for the "PID=3" patient. Accordingly, timeline 902 is rendered using data retrieved for the "PID=3" instance of the "patient" model entity. Timeline rendering 902 includes birthdate 952 that marks the beginning of timeline rendering 950. Because database 300 has a "null" value stored for the "death" date of this patient, the end date (or duration) of the timeline is the current date. Data retrieved for each instance based logical filed is plotted as a point on the timeline (e.g., as part of step 810 of method 800). Each point indicates the location on the timeline as well as the logical field and data value for the point. And each duration event is plotted on the timeline for the duration of the event (e.g., as part of step 812 of method 800). For example, duration event 955 is rendered on the timeline indicating a pregnancy event for the selected model entity rendered on timeline 902, and duration event 960 displays an employment period.

In one embodiment, events rendered timeline 902 may by displayed using a hyperlink. A hyperlink, or simply a link, is a reference in one display to another display. Thus, the timeline rendering may allow a user to focus in on different portions of the timeline based on the events already rendered. Alternatively, another embodiment may provide controls (e.g., buttons 970) that allow a user to magnify or reduce the complete segment of the timeline display currently rendered. Further, in one embodiment different timeline events may specify different precedence values, and only instance values above a threshold value are displayed. Other values may be obtained by zooming in on a section of the timeline or by selecting a hyperlink event rendered on the timeline display 902. Those skilled in the art will recognize that other customizations or features may be added to the timeline display without departing from the scope of the present invention, and further, that graphical user interface screen 900 is representative of many possible graphical user interface screens that may be used to render abstract record data on timeline 902.

Database Abstraction Model: Model Entity Switching

In one embodiment, screen 900 may provide a user with the ability to switch the model entity rendered on timeline 902 without changing the query data. For example, duration event 960 indicates an employment term for the patient rendered on screen 900. This indicates that the individual represented by the "patient" model entity, "PID=3", also has data in the underlying database as an instance of the "employee" model entity "EID=3". As described above, different cross sections of data from the underlying database are available for different model entities.

In one embodiment, database abstraction model 148 includes conversion data used to map one model entity to another using a conversion function. For example, Table III illustrates a conversion section for model entity relationships 225 (from FIG. 6).

TABLE III

Model Entity Relationships - Model Entity Conversion
DATABASE ABSTRACTION MODEL

```
Patient Model Entity Relationships
Model Entity Mappings
  From Patients to Employee
    Conversion function: SQL
      Select EID from Employee where EID = PID and PID = ?
  From Employee to Patients
    Conversion function: SQL
      Select PID from Employee where PID = EID and EID = ?
```

As illustrated, Table III specifies conversion functions that use an SQL query to retrieve an instance of a target model entity from the instance of a current model entity. A conversion function maps between the "patient" and "employee" model entities. The "?" parameter is supplied using the actual model entity being switched. That is, to switch from the rendering of the "patient" model entity illustrated in screen 900, to the "employee" model entity illustrated in screen 1100, the conversion function uses the "PID=3" value of the current model entity to retrieve the "EID=300" value of the target model entity. If a "null" value is returned for the conversion function, then the instance of the model entity currently displayed has no corresponding instance of the target model entity. For example, not all patients will also be employees. In one embodiment, if a user attempts to switch between a current model entity to a target model entity that that cannot be mapped into the target, interface 115 may be configured to display an error message.

In one embodiment, while results are displayed on interface 115 for a first model entity, the runtime component 114 executes any conversion functions defined in the database abstraction model 148 for the current model entity to determine whether an instance of another model entity is available. If so, the screen 900 may be updated to indicate that a model entity switch is available for the current instance being displayed.

Database 300 includes three instances of the patient model entity: 1, 2, and 3. Only the "PID"=3" instance of the "patient" model entity, however, has a corresponding "EID" value. The conversion function illustrated in Table III specifies how to switch from the "patient" model entity view of the "PID=3" instance of the patients model entity, to the target "EID=300" instance of the "employee" model entity.

FIG. 10 illustrates a method for switching from a current model entity to a target model entity, according to one embodiment of the invention. The method begins at step 1000 when the runtime component 114 receives, from a requesting entity, a request to switch the display of a current model entity to a target model entity. The request may be generated by a user interacting with query interface 115. For example, a user viewing one instance of the "patient" model entity may wish to view data about the particular patient from the perspective of the "employee" model entity. A button or other suitable control provided by interface 115 may be used to generate the request.

At step 1004, the current model entity being viewed is identified. Next, the specific instance of the model entity is identified. For example, the model entity displayed on screen 900 is the "PID=3" instance of the "patient" model entity. Using the current model entity, at step 1006, a determination is made whether the database abstraction model 148 includes a conversion function for the current model entity. If not, an error message is displayed indicating that the requested mapping is not available. In one embodiment, if multiple switches are possible, a user is prompted to specify the desired target model entity. Consider, e.g., a doctor, who was also both an employee and a patient. If a conversion function exists, the method 1000 queries whether an instance of the target model entity exists for the instance of the current model entity at step 1008. That is, the identifier for the current model entity is passed to the conversion function, and if available, the identifier for the target model entity is returned. If so, the data related to the target model entity is retrieved at step 1010.

Next, the instance of the target model entity is rendered at step 1012. For example, the instance of the target model entity determined at step 1018 may be used as input value to step 802 of the method 800 illustrated in FIG. 8. FIG. 11 illustrates another view of screen 900 after a switch from the "patient" model entity displayed in FIG. 9 to the "employee" model entity. Accordingly, timeline display 1110 renders data from the employee abstract record for the selected instance ("EID=300") 1111 of the employee model entity. Timeline 1110 now begins at the employee hire date and ends at the current date. In addition, other data rendered on the timeline now corresponds to the employee abstract record.

In one embodiment, the runtime component 114 may be configured to determine whether an instance of a model entity being displayed may be mapped into another model entity without waiting to receive a request. And, if so, to present an indication of this on database query interface 115. Further, data returned for one model entity may include the instance of a different model entity. In one embodiment, a user may be presented with an indication of any model entity instances that are part of the abstract record for the model entity currently being rendered (e.g., the "*" in duration event 960).

Model Entity Switching: One-to-Many

In one embodiment, the mapping between model entities could result in a one-to-many conversion from the original model entity to the target. That is, the identifier for the current model entity could map to multiple identifiers of a target model entity. For example, consider a new model entity "publications." Often, one doctor may have many publications. A conversion function that specifies a mapping to a table containing publications by the various doctors could be used. A doctor may have more than one publication in such a table. In one embodiment, when a switch is requested, a user may be presented with the list of choices and they pick the one used to proceed. In such a case, the determination that occurs at step 1018 is used to determine "which" instance of the target model entity to use. Alternatively, a user might be presented with multiple renderings of the timeline. For a model entity like publication, the duration might begin with the first publication of an article authored by the doctor, include reviews of the work after its completion, and include subsequent citations of the work. Further, as this example illustrates, model entities need not be 'closely related' as the "patient" and "employee" model entities in order for the interface 115 to provide model entity switching.

Conclusion

Embodiments of the present invention display data related to a model entity rendered using a timeline display. Each model entity defines a central concept or entity, this way, query results provide not just data from the underlying database, but also provide data in context about an entity or concept. Further, once data for a model entity is displayed, a user may wish to view information about a current model entity in other contexts. Embodiments of the invention provide for model entity switching to accomplish this result.

In one embodiment, users compose a query to retrieve a set of instances of a model entity and corresponding abstract records. Users then select an instance of the model entity to display in detail. Data for the selected model entity is displayed on the timeline. In addition, as described in greater detail above, the abstract record represents a hierarchy of data about the model entity. And data on the timeline may display the hierarchy as a set of hyperlinks, allowing a user to retrieve additional detail about a particular item on the item on the timeline in greater detail by selecting one of the hyperlinks. Thus, the amount of detail on the timeline may change according as a user may desire.

The foregoing examples reference medical research environments. However, these examples are provided merely to illustrate embodiments and particular implementations. More broadly, embodiments of the invention are contemplated for any data environment including, for example, transactional environments, financial research environments, accounting environments, legal environments, and the like.

While the foregoing is directed to embodiments of the present invention, other and further embodiments of the invention may be devised without departing from the basic scope thereof, and the scope thereof is determined by the claims that follow.

What is claimed is:

1. A method of displaying physical data retrieved from an underlying physical database, comprising:
    providing a database abstraction model defining:
    (a) a plurality of logical fields each having an access method that specifies at least a method to access the physical data associated with the logical field; and
    (b) a plurality of model entities, wherein each model entity identifies (i) a set of logical fields each mapping to logically related physical data; and (ii) an identifier in the database used to identify instances of the model entity; wherein, for each model entity, a first logical field of the corresponding set of logical fields includes a timeline attribute defining a timeline for the model entity and wherein a second logical field of the corresponding set of logical fields includes a timeline attribute defining where the physical data associated with the second logical field occurs on the timeline;
    receiving a request to display data related to an instance of one of the plurality of model entities;
    retrieving, from the database, physical data corresponding to the set of logical fields for the instance of the model entity;
    displaying the timeline for the instance, based on the timeline attribute for the first logical field; and
    displaying an event on the timeline, based on the timeline attribute for the second logical field, wherein the event corresponds to the physical data associated with the second logical field, wherein the timeline attribute for the second logical field specifies that the event comprises a duration type event, and wherein the duration type event is rendered over a segment of the timeline that indicates, relative to the timeline for the instance of the model entity, a period of time when a condition symbolized by the event occurred.

2. The method of claim 1, further comprising: an instance type event rendered on a single point on the timeline that indicates, relative to the timeline for the instance of the model entity, when the data was obtained or when an event symbolized by the data occurred.

3. The method of claim 1, retrieving, from the underlying physical database, physical data corresponding to the set of logical fields, generating a physical query of the underlying physical database according to the access method specified for the logical field, and executing the physical query to retrieve a set of query results for the set of logical fields.

4. The method of claim 3, wherein the set of logical fields are specified by an abstract record, wherein the abstract record identifies all of the logical fields defined by the database abstraction model that map to data related to the model entity and specifies the relationships between logical fields included in the abstract record.

5. The method of claim 4, wherein retrieving data corresponding to the set of logical fields comprises, retrieving data for fewer than all of the logical fields specified in the abstract record.

6. The method of claim 1, wherein the instance of a model entity is selected by a user in response to a display of all instances of the model entity in the underlying database.

7. The method of claim 1, wherein the instance of the model entity is selected from a set of instances retrieved from the database using an abstract query, wherein the abstract query specifies (i) the model entity being queried; (ii) a set of conditional expressions, wherein each conditional expression includes a logical field, a conditional operator, and a comparison value; and (iii) a set of logical fields used to retrieve a set of query results that are consistent with the set of conditions.

8. The method of claim 1, further comprising:
    identifying an instance of a second model entity included in the physical data displayed to the user; and
    switching to a display of the physical data related to the instance of the second model entity, and rendering, relative to the timeline for the instance of the second model entity, data related to the second model entity on the timeline.

9. A system to access data in an underlying physical database, comprising:
    a database abstraction model defining (i) a plurality of logical fields, wherein each logical field specifies at least an access method mapping the logical field to data in the physical database, wherein at least one logical field includes a timeline attribute that indicates where data elements retrieved for the logical field occur on a timeline, wherein the timeline attribute for the at least one logical field specifies that data corresponding to the logical field specifies a duration type data, and wherein duration type data is rendered over a segment of the timeline that indicates, relative to the timeline for the instance of the model entity, a period of time when a condition symbolized by the data occurred, and (ii) a plurality of model entities each specifying an item of data in the database used to identify an instance of the model entity and further specifying an abstract record associated with the model entity, wherein the abstract record specifies a set of logical fields that map to data related to the model entity;
    a database query application configured to display data related to the instance of the model entity, including the display of at least some of the data rendered on a timeline, relative to the model entity; and
    a runtime component configured (i) to receive, from the database query interface, a request to view the data related to the instance of the model entity, and in response, to generate and execute a physical query of the database, wherein executing the physical query retrieves a set of query results corresponding to the set of logical fields and (ii) to return the query results to the query building interface.

10. The system of claim 9, further comprising: an instance type data rendered on a single point on the timeline that indicates, relative to the timeline for the instance of the model entity, when the data was obtained or when an event symbolized by the data occurred.

11. The system of claim 9, wherein the database query application is further configured to display an indication of a second model entity included in the data returned to the database query interface, and switching, in response to a user request, to a display of data related to the instance of the second model entity, and rendering on the timeline, relative to the timeline identified for the second model entity, data related to the second model entity.

12. A program product, comprising:
   a computer storage readable medium containing a program, comprising:
   (a) a plurality of logical fields each having an access method that specifies at least a method to access the physical data associated with the logical field;
   (b) a plurality of model entities, wherein each model entity identifies (i) a set of logical fields, from the plurality of logical fields, that map to logically related physical data; and (ii) an identifier in the underlying database used to identify instances of the model entity; wherein a first logical field of each set of logical fields for each model entity includes a timeline attribute defining a timeline for the model entity and wherein a second logical field of each set of logical fields for each model entity defines where the physical data associated with the second logical field occurs on the timeline for the model entity; and
   (c) a database query application configured to receive a request to display data related to an instance of one of the plurality of model entities, and in response to receiving the request:
      retrieve, from a physical database, physical data corresponding to the set of logical fields for the instance model entity;
      display the timeline for the instance, based on the timeline attribute for the first logical field; and
      display an event on the timeline, based on the timeline attribute for the second logical field, wherein the event corresponds to the physical data associated with the second logical field, wherein the timeline attribute for the second logical field specifies that the event corresponding to the logical field comprises a duration type event, and wherein duration type events are rendered over a segment of the timeline that indicates, relative to the timeline for the instance of the model entity, a period of time when a condition symbolized by the event occurred.

13. The program product of claim 12, further comprising:
   an instance event rendered on a single point on the timeline that indicates, relative to the timeline for the instance of the model entity, when the data was obtained or when an event symbolized by the data occurred.

14. The program product of claim 12, wherein the instance of a model entity is selected by a user interacting with the database query application response to a display of all instances of the model entity in the underlying database.

15. The program product of claim 12, wherein the instance of the model entity is selected from a set of instances retrieved from the database using an abstract query composed a by a user interacting with the database query application, wherein the abstract query specifies (i) the model entity being queried; (ii) a set of conditional expressions, wherein each conditional expression includes a logical field, a conditional operator, and a comparison value; and (iii) a set of logical fields used to retrieve the set of instances of the model entity that are consistent with the set of conditions.

16. The program product of claim 12, wherein the database query application is further configured to:
   display an indication of a second model entity included in the retrieved data;
   switch, in response to a user request, to a display of data related to the instance of the second model entity; and
   render on the timeline, relative to a timeline identified for the second model entity, data related to the second model entity.

* * * * *